US012595396B2

(12) United States Patent
Hamzik et al.

(10) Patent No.: US 12,595,396 B2
(45) Date of Patent: Apr. 7, 2026

(54) ACID RESISTANT FILTER MEDIA

(71) Applicant: ENTEGRIS, INC., Billerica, MA (US)

(72) Inventors: James Hamzik, North Billerica, MA (US); KwokShun Cheng, Nashua, NH (US); Jad A. Jaber, Westford, MA (US); Nicholas J. Filipancic, Medford, MA (US)

(73) Assignee: Entegris, Inc., Billerica, MA (US)

( * ) Notice: Subject to any disclaimer, the term of this patent is extended or adjusted under 35 U.S.C. 154(b) by 553 days.

(21) Appl. No.: 17/356,201

(22) Filed: Jun. 23, 2021

(65) Prior Publication Data

US 2021/0395566 A1      Dec. 23, 2021

Related U.S. Application Data

(60) Provisional application No. 63/043,013, filed on Jun. 23, 2020.

(51) Int. Cl.
| | |
|---|---|
| *C09D 177/02* | (2006.01) |
| *B01D 67/00* | (2006.01) |
| *B01D 69/02* | (2006.01) |
| *B01D 69/10* | (2006.01) |
| *B01D 69/12* | (2006.01) |
| *B01D 71/40* | (2006.01) |
| *B01D 71/56* | (2006.01) |

(52) U.S. Cl.
CPC ..... *C09D 177/02* (2013.01); *B01D 67/00931* (2022.08); *B01D 69/02* (2013.01); *B01D 69/10* (2013.01); *B01D 69/1251* (2022.08); *B01D 71/401* (2022.08); *B01D 71/56* (2013.01); *B01D 2239/0478* (2013.01); *B01D 2325/36* (2013.01)

(58) Field of Classification Search
None
See application file for complete search history.

(56) References Cited

U.S. PATENT DOCUMENTS

| | | | |
|---|---|---|---|
| 4,604,208 | A | 8/1986 | Chu |
| 4,618,533 | A | 10/1986 | Steuck |
| 4,702,840 | A | 10/1987 | Degen |
| 4,711,793 | A | 12/1987 | Ostreicher |
| 4,794,002 | A | 12/1988 | Henis |
| 5,411,663 | A | 5/1995 | Johnson |

(Continued)

FOREIGN PATENT DOCUMENTS

| | | |
|---|---|---|
| CN | 216703954 U | 6/2022 |
| EP | 3463631 A1 | 4/2019 |

(Continued)

OTHER PUBLICATIONS

Kris Behler, et al., New solvent for polyamides and its application to the electrospinning of polyamides 11 and 12, Polymer, vol. 48, Issue 22, 2007, pp. 6617-6621 (Year: 2007).*

(Continued)

*Primary Examiner* — Benjamin L Lebron
*Assistant Examiner* — Eric J Mccullough

(57) ABSTRACT

Provided are certain membranes useful in the filtration of liquids and removal of various contaminants therein. In certain aspects the membranes have as one component a polyamide such as Nylon 11 and/or Nylon 12. Also provided is methodology for manufacturing such membranes and their use in filtration and purification of liquids. Membranes of the disclosure thus prepared exhibit superior acid stability when compared to polyamide membranes prepared from Nylon 6 or Nylon 6,6.

12 Claims, 4 Drawing Sheets

(56) References Cited

U.S. PATENT DOCUMENTS

| | | | |
|---|---|---|---|
| 5,503,746 A | 4/1996 | Gagnon | |
| 5,695,640 A | 12/1997 | Tseng | |
| 6,214,382 B1 | 4/2001 | Eguchi | |
| 8,602,223 B2 | 12/2013 | Qiu | |
| 2003/0036085 A1* | 2/2003 | Salinaro | B01D 69/02 |
| | | | 210/488 |
| 2003/0146150 A1 | 8/2003 | Hayashi | |
| 2006/0231487 A1 | 10/2006 | Bartley et al. | |
| 2010/0305217 A1* | 12/2010 | Qiu | B01D 67/0088 |
| | | | 427/245 |
| 2018/0290109 A1 | 10/2018 | Jaber | |
| 2019/0329184 A1 | 10/2019 | Antony Prince | |
| 2019/0329185 A1 | 10/2019 | Jaber | |

FOREIGN PATENT DOCUMENTS

| | | | |
|---|---|---|---|
| JP | 2004332123 A | 11/2004 | |
| KR | 20190123010 A | 10/2019 | |
| WO | 2005072487 A2 | 8/2005 | |
| WO | 2012102942 A1 | 8/2012 | |
| WO | 2014109946 A1 | 7/2014 | |
| WO | WO-2017205722 A1 * | 11/2017 | ........... B01D 7/0088 |

OTHER PUBLICATIONS

Jinxin Fan, et al., Facile preparation of salt-tolerant anion-exchange membrane adsorber using hydrophobic membrane as substrate, Journal of Chromatography A, vol. 1490, 2017, pp. 54-62 (Year: 2017).*

Behler, K. et al.; "New Solvent for Polyamides and its application to the electrospinning of polyamides 11 and 12"; Polymer, 48, pp. 6617-6621; 2007; (abstract only).

Ultramid 1C: The Soluble Polyamid, Physical Properties Handout/ Information Sheet, BSAF Plastics, 2010.

* cited by examiner

ACID RESISTANT FILTER MEDIA

CROSS-REFERENCE TO RELATED APPLICATIONS

This application claims the benefit under 35 USC 119 of U.S. Provisional Patent Application No. 63/043,013 filed Jun. 23, 2020, the disclosure of which is hereby incorporated herein by reference in its entirety.

TECHNICAL FIELD

The present disclosure relates to composite filter media or membranes which include a porous polymeric filter which has been coated with a layer comprising certain polyamide polymers.

BACKGROUND

Filter products are indispensable tools of modern industry, used to remove unwanted materials from a flow of a useful fluid. Useful fluids that are processed using filters include water, liquid industrial solvents and processing fluids, industrial gases used for manufacturing or processing (e.g., in semiconductor fabrication), and liquids that have medical or pharmaceutical uses. Unwanted materials that are removed from fluids include impurities and contaminants such as particles, microorganisms, and dissolved chemical species. Specific examples of filter applications include their use with liquid materials for semiconductor and microelectronic device manufacturing.

To perform a filtration function, a filter includes a filter membrane that is responsible for removing unwanted material from a fluid that passes through the filter membrane. The filter membrane may, as required, be in the form of a flat sheet, which may be wound (e.g., spirally), flat, pleated, or disk-shaped. The filter membrane may alternatively be in the form of a hollow fiber. The filter membrane can be contained within a housing or otherwise supported so that fluid that is being filtered enters through a filter inlet and is required to pass through the filter membrane before passing through a filter outlet.

A filter membrane can be constructed of a porous structure that has average pore sizes that can be selected based on the use of the filter, i.e., the type of filtration performed by the filter. Typical pore sizes are in the micron or sub-micron range, such as from about 0.001 micron to about 10 microns. Membranes with average pore size of from about 0.001 to about 0.05 micron are sometimes classified as ultrafilter membranes. Membranes with pore sizes between about 0.05 and 10 microns are sometimes referred to as microporous membranes.

A filter membrane having micron or sub-micron-range pore sizes can be effective to remove an unwanted material from a fluid flow either by a sieving mechanism or a non-sieving mechanism, or by both. A sieving mechanism is a mode of filtration by which a particle is removed from a flow of liquid by mechanical retention of the particle at a surface of a filter membrane, which acts to mechanically interfere with the movement of the particle and retain the particle within the filter, mechanically preventing flow of the particle through the filter. Typically, the particle can be larger than pores of the filter. A "non-sieving" filtration mechanism is a mode of filtration by which a filter membrane retains a suspended particle or dissolved material contained in flow of fluid through the filter membrane in a manner that is not exclusively mechanical, e.g., that includes an electrostatic mechanism by which a particulate or dissolved impurity is electrostatically attracted to and retained at a filter surface and removed from the fluid flow; the particle may be dissolved, or may be solid with a particle size that is smaller than pores of the filter medium.

The removal of ionic materials such as dissolved anions or cations from solutions is important in many industries, such as the microelectronics industry, where ionic contaminants and particles in very small concentrations can adversely affect the quality and performance of microprocessors and memory devices. The ability to prepare positive and negative photoresists with low levels of metal ion contaminants, or the ability to deliver isopropyl alcohol used in Maragoni drying for wafer cleaning with low part per billion or part per trillion levels of metal ion contaminants is highly desirable and are just two examples of the needs for contamination control in semiconductor manufacturing. Colloidal particles, which can be positively or negatively charged depending on the colloid chemistry and solution pH, can also contaminate process liquids and need to be removed. Dissolved ionic materials can be removed by way of a non-sieving filtration mechanism, by microporous filter membranes that are made of polymeric materials that attract dissolved ionic materials. Examples of such microporous membranes are made from chemically inert, low surface energy polymers like ultrahigh molecular weight polyethylene ("UPE"), polytetrafluoroethylene, nylon, and the like. Nylon filter membranes, in specific, are used in a variety of different filtration applications in the semiconductor processing industry, due to the ability to form nylon into filter membranes that exhibit high permeability and due to good non-sieving filtration behavior of nylon. However, due to the hydrolytic instability of the amide linkage, many commercially available nylon filter membranes are unsuitable in those applications where the membrane is exposed to strong acids; similarly, such nylon filter membranes cannot be cleaned with acidic solutions.

SUMMARY

The field of microelectronic device processing requires steady improvements in processing materials and methods to sustain parallel steady improvements in the performance (e.g., speed and reliability) of microelectronic devices. Opportunities to improve microelectronic device fabrication exist in all aspects of the manufacturing process, including methods and systems for filtering liquid materials.

A large range of different types of liquid materials are used as process solvents, cleaning agents, and other processing solutions, in microelectronic device processing. Many if not most of these materials are used at a very high level of purity. As an example, liquid materials (e.g., solvents) used in photolithography processing of microelectronic devices must be of very high purity. Specific examples of liquids that are used in microelectronic device processing include process solutions for spin-on-glass (SOG) techniques, for backside anti-reflective coating (BARC) methods, and for photolithography. Some of these liquid materials are acidic. To provide these liquid materials at a high level of purity for use in microelectronic device processing, a filtering system must be highly effective to remove various contaminants and impurities from the liquid, and must be stable (i.e., not degrade or introduce contaminants) in the presence of the liquid material being filtered (e.g., an acidic material).

In a first aspect, a porous composite filter membrane comprises: a porous hydrophobic polymeric filter media having a coating thereon, wherein said coating is a polyamide polymer which is soluble in a blend of formic acid and dichloromethane.

In a second aspect, a porous polymer membrane comprises a polyamide polymer which is soluble in a mixture of formic acid and dichloromethane. Such membranes can be prepared using known air-casting techniques to provide polyamide or Nylon membranes which exhibit superior acid stability when compared to polyamide membranes prepared from Nylon 6 or Nylon 6,6. In one embodiment, the membranes of this second aspect are prepared from Nylon 11 and/or Nylon 12.

In a third aspect, a porous hydrophobic polymeric filter membrane having coated thereon a polyamide coating as a first coating, wherein said coating is a polyamide polymer which is soluble in a blend of formic acid and dichloromethane, thereby providing a polyamide-coated membrane, wherein said polyamide-coated membrane has a second coating thereon, which is the free-radical reaction product of (i) at least one crosslinker; and (ii) at least one monomer, in the presence of a photo-initiator.

In a fourth aspect, a porous filter membrane comprises a polyamide polymer which is soluble in a mixture of formic acid and dichloromethane, which membrane is thereafter coated with the free-radical reaction product of (i) at least one crosslinker; and (ii) at least one acrylamide monomer, in the presence of a photo-initiator.

In a fifth aspect:

(a) a porous filter membrane comprises a polyamide polymer which is soluble in a mixture of formic acid and dichloromethane, wherein said membrane is grafted with pendant hydrophilic groups chosen from hydroxyl groups, amine groups, carboxylic groups, or combinations thereof; and pendant ionic groups that are different from the pendant hydrophilic groups; and (b) a porous composite filter membrane comprises a porous hydrophobic polymeric filter membrane having coated thereon a coating, wherein said coating is a polyamide polymer which is soluble in a mixture of formic acid and dichloromethane, thereby providing a polyamide-coated membrane, which membrane thereafter grafted with pendant hydrophilic groups chosen from (i) hydroxyl groups, amine groups, carboxylic groups, or combinations thereof; and (ii) pendant ionic groups that are different from the pendant hydrophilic groups.

In other aspects, this disclosure provides methods for preparing the filter membranes of the first through fifth aspects. In another aspect, the disclosure provides a method for removing an impurity from a liquid, which comprises contacting the liquid with the membranes of the disclosure.

The filter membranes such as the polyamide membrane of the second aspect, the underlying porous hydrophobic membrane used as starting material in the first aspect, the third aspect, the fourth aspect, and the second embodiment (b) of the fifth aspect, can all be prepared from the underlying polymer compositions using known methodology such as air-casting. See, for example, U.S. Pat. No. 7,891,500, and references cited therein, incorporated herein by reference. Alternately, the underlying filter membranes can be prepared by known methods such as phase inversion, interfacial polymerization, stretching, track-etching and electrospinning. See, for example, B. S. Lalia et al., *Desalination* 326 (2013) 77-95 and P. van de Witte, et al., *Journal of Membrane Science* 117 (1996) 1-31.

BRIEF DESCRIPTION OF THE DRAWINGS

The disclosure may be more completely understood in consideration of the following description of various illustrative embodiments in connection with the accompanying drawings.

Figure 1:
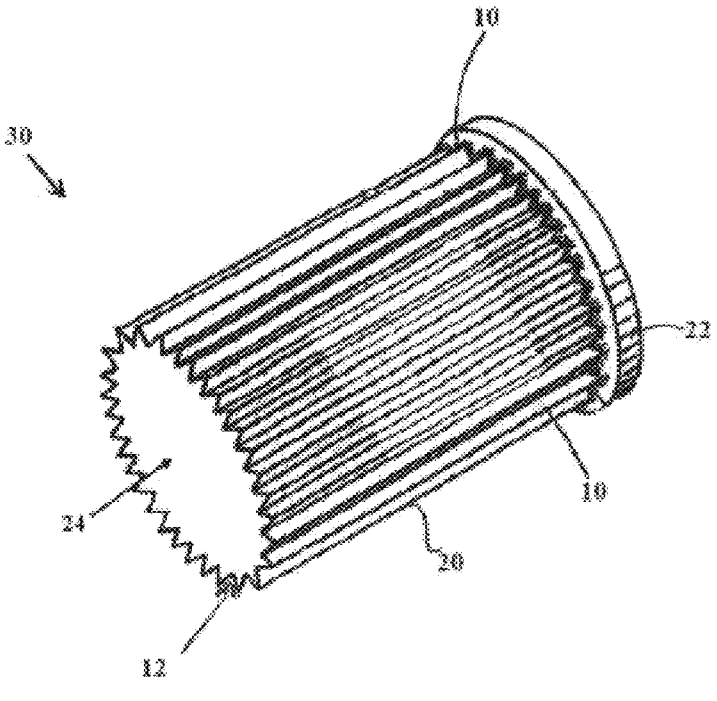
FIG. 1 (which is schematic and not necessarily to scale) shows an example of a filter product as described herein.
Figure 2:
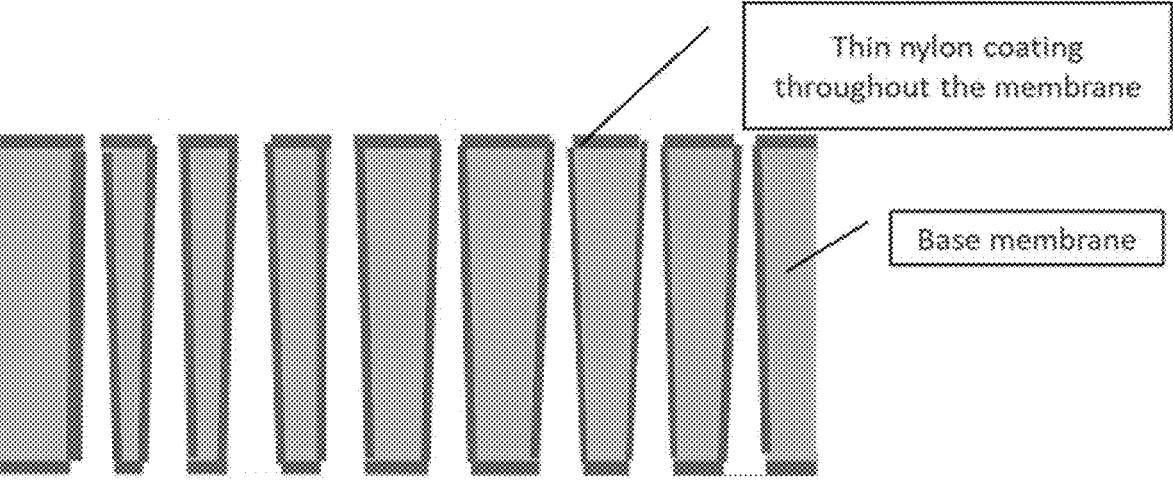
FIG. 2 is a simplified depiction of a porous filter membrane coated with a polyamide. As noted below, the polyamide coating and/or the cured coatings do not necessarily form a continuous coating on the base membrane as shown.
Figure 3:
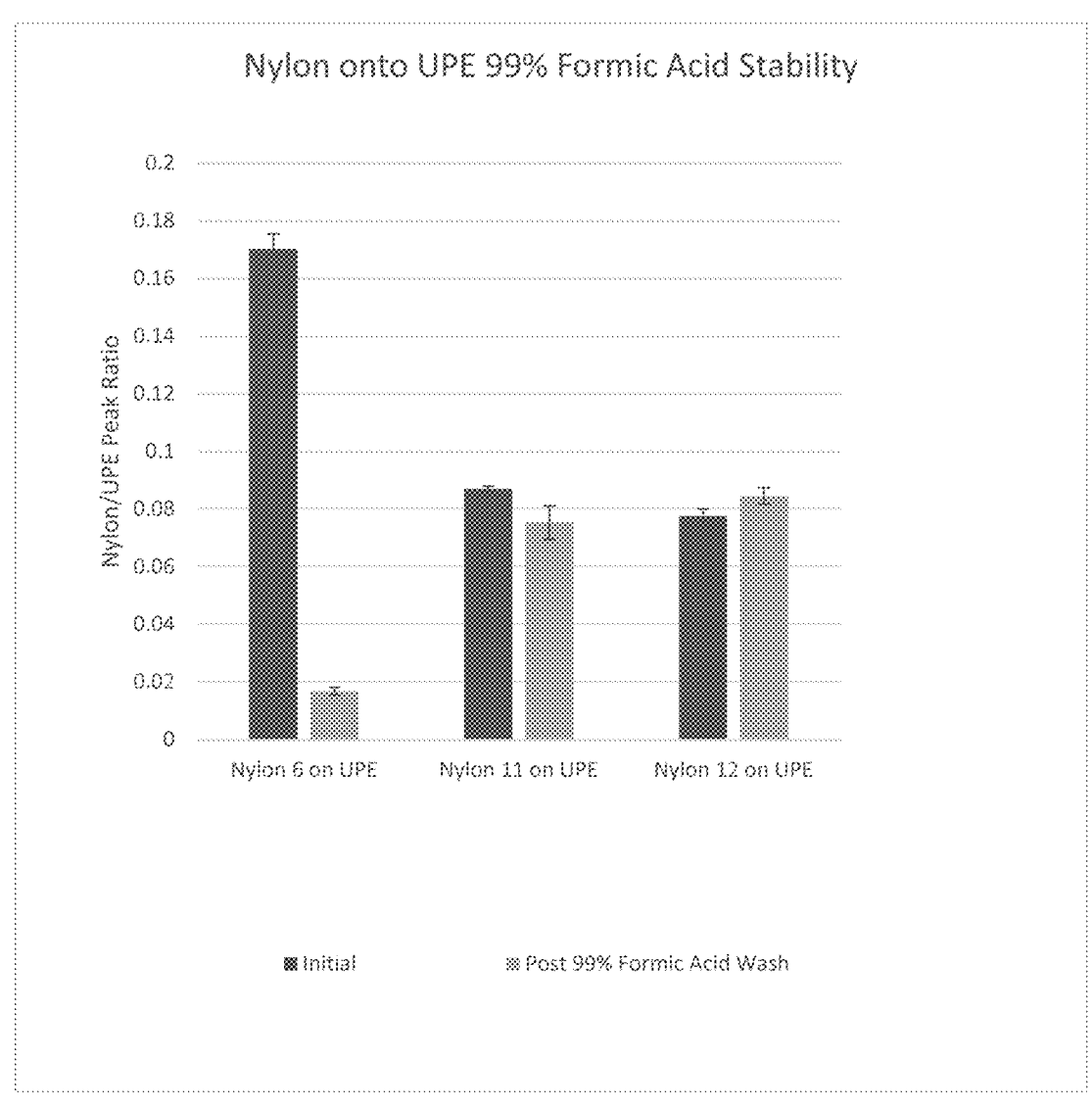
FIG. 3 is a comparison of the stability of UPE membranes coated with Nylon 6, Nylon 11, and Nylon 12. Each bar on the left represents initial data and each bar to the right represents the data after 99% formic acid wash. This data illustrates the superior acid stability of representative membranes of this disclosure, specifically those of the second aspect, as described below.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DETAILED DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g. 1 to 5 includes 1, 1.5, 2, 2.75, 3, 3.80, 4 and 5).

As noted above, in a first aspect, a porous composite filter membrane comprises: a porous hydrophobic polymeric filter membrane having a coating thereon, wherein said coating is a polyamide polymer which is soluble in a mixture of formic acid and dichloromethane. In one embodiment, this mixture of formic acid and dichloromethane is a 1:1 (volume: volume) mixture. In one embodiment of this aspect, the polyamides possess the general repeat unit —$[(CH_2)_xC(O)NH]_n$—, wherein x is an integer of from about 8 to 12, and n represents the number of repeat units in the polyamide polymer. In certain embodiments, the polyamide polymer is chosen from Nylon 11 and Nylon 12 or blends thereof. In certain embodiments, said membrane has a bubble point of about 20 to 200 psi, when measured using ethoxy-nonafluorobutane HFE 7200 at a temperature of about 22° C., and/or said membrane has the capacity to bind Ponceau S dye of between about 1 and about 30 $\mu g/cm^2$ and the capacity to bind methylene blue dye (MB DBC) of between about 1 and about 30 $\mu g/cm^2$. In certain embodiments, the membrane has an isopropanol flowtime of about 150 to about 20,000 seconds/500 mL, measured at 14.2 psi.

Figure 4:
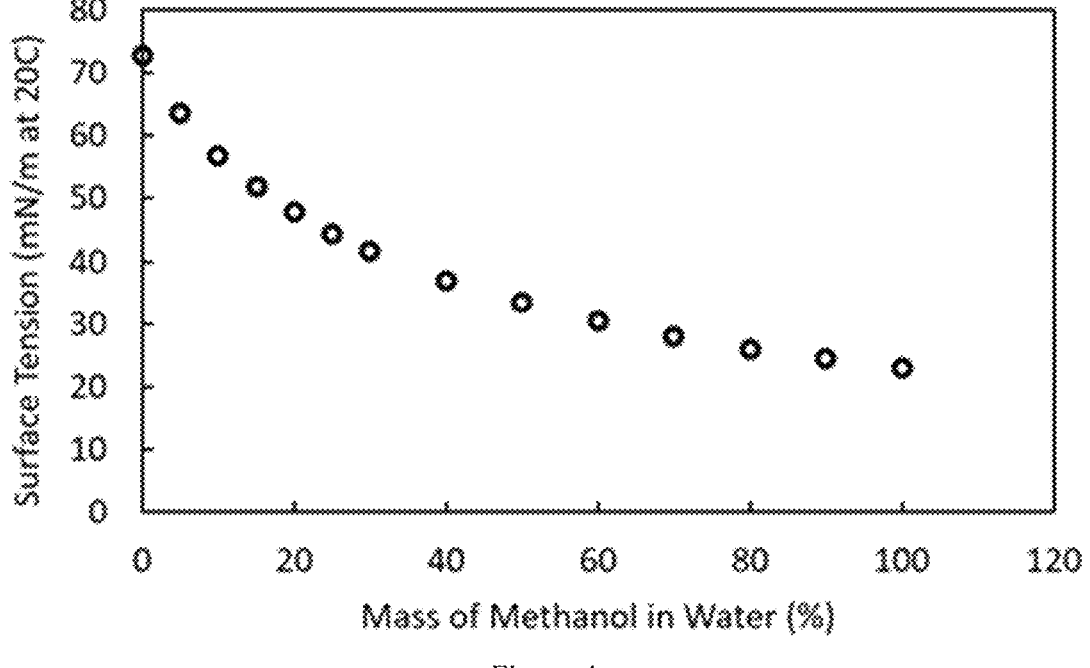
FIG. 4 is an illustration of the surface tension of methanol and water mixtures at 20° C. Surface tension (nM/m at 20° C.) is plotted versus mass methanol in water (%).

In this first aspect, the composite membranes, starting with a porous hydrophobic filter membrane such as those comprised of ultrahigh molecular weight polyethylene ("UPE"), are treated with a solution of a polyamide polymer in a mixture of formic acid and dichloromethane. Once the membrane is coated, it is transferred to a vessel which contains a solution comprising water. The resulting membrane is then subjected to one or more cleaning steps involving passage through aqueous and lower alcoholic (e.g., $C_1$-$C_4$ alcohols) cleaning vessels. Upon drying, the process provides the composite membranes of the first aspect. As shown in FIG. 4, demonstrative membranes of the first aspect of the disclosure exhibited superior acid stability when compared to an analogous membrane prepared using Nylon 6.

In certain embodiments, the surface energy is greater than 30, from about 30 to about 100, or about 30 to about 85, or about 30 to about 65 dynes/cm.

As noted above, in a second aspect, the disclosure provides a porous filter membrane comprising a polyamide polymer which is soluble in a mixture of formic acid and dichloromethane. In one embodiment, this mixture of formic acid and dichloromethane is a 1:1 (volume:volume) mixture. Such membranes can be prepared by dissolving such polyamides in a mixture of formic acid and dichloromethane to form a polyamide solution, which is then subjected to known air-casting techniques to provide novel polyamide membranes having greatly improved acid stability over analogous nylon membranes comprising Nylon 6 or Nylon 6,6. In one embodiment, the polyamides of this aspect possess the general repeat unit —[(CH$_2$)$_x$C(O)NH]$_n$—, wherein x is an integer of from about 8 to 12, and n represents the number of repeat units in the polyamide polymer. In certain embodiments, the polyamide polymer is chosen from Nylon 11 and Nylon 12 or blends thereof. In certain embodiments, said membrane has a bubble point of about 20 to about 200 psi, when measured using ethoxy-nonafluorobutane HFE 7200 at a temperature of about 22° C. and/or said membrane has the capacity to bind Ponceau S dye of between about 1 and about 100 μg/cm$^2$ and the capacity to bind methylene blue dye (MB DBC) of between about 1 and about 100 μg/cm$^2$. In certain embodiments, the membrane has an isopropanol flowtime of about 150 to about 20,000 seconds/500 mL, measured at 14.2 psi.

In certain embodiments, the surface energy is greater than 30, from about 30 to about 100, or about 30 to about 85, or about 30 to about 65 dynes/cm.

As noted above, in a third aspect, a porous composite filter membrane comprises a porous hydrophobic polymeric filter membrane having coated thereon a polyamide coating, wherein said coating is a polyamide polymer which is soluble in a blend of formic acid and dichloromethane, thereby providing a polyamide-coated membrane, which membrane is thereafter coated with the free-radical reaction product of (i) at least one crosslinker; and (ii) at least one monomer, in the presence of a photo-initiator. In one embodiment of this aspect of the disclosure, the polyamides possess the repeat unit —[(CH$_2$)$_x$C(O)NH]$_n$—, wherein x is an integer of from about 8 to 12, and n represents the number of repeat units in the polyamide polymer. In certain embodiments, the polyamide polymer is chosen from Nylon 11 and Nylon 12 or blends thereof. In this aspect, the crosslinker and monomer (as will be more fully discussed below) are not grafted onto the surface of the polyamide-coated hydrophobic membrane, but rather are polymerized at or near the surface of said membrane and form an additional partial coating thereon. In certain embodiments, said membrane has a bubble point of about 20 to about 200 psi, when measured using ethoxy-nonafluorobutane HFE 7200 at a temperature of about 22° C., and/or said membrane has the capacity to bind Ponceau S dye of between about 1 and about 30 μg/cm$^2$ and the capacity to bind methylene blue dye (MB DBC) of between about 1 and about 30 μg/cm$^2$. In certain embodiments, the membrane has an isopropanol flowtime of about 150 to about 20,000 seconds/500 mL, measured at 14.2 psi.

In this third aspect of the disclosure, the composite membrane, starting with a porous hydrophobic filter membrane such as those comprised of ultrahigh molecular weight polyethylene, is treated with a solution of such a polyamide polymer in a mixture of formic acid and dichloromethane, for example in a 50/50 proportion (by volume). Once the membrane is coated, it is transferred to a mixing vessel which contains an aqueous solution comprising (i) at least one crosslinker, (ii) at least one monomer, and (iii) at least one photoinitiator, hereinafter referred to as the "monomer solution". The thus-coated membrane can then be subjected to UV light in order to initiate a free radical polymerization at or near the surface of the polyamide coating with the (i) at least one crosslinker and the (ii) at least one charged acrylamide monomer. The resulting membrane is then subjected to one or more cleaning steps involving passage through aqueous and lower alcoholic (e.g., $C_1$-$C_4$ alkanols) cleaning vessels. Upon drying, the process provides the composite membranes of this third aspect of the disclosure.

In certain embodiments, the surface energy is greater than 30, from about 30 to about 100, or about 30 to about 85, or about 30 to about 65 dynes/cm.

In this third aspect of the disclosure, the crosslinkers as referred to above are uncharged difunctional (i.e., having two carbon-carbon double bonds) vinyl, acrylic or methacrylic monomeric species, optionally having an amide functionality. Non-limiting examples of such crosslinkers include methylene bis(acrylamide), tetraethylene glycol diacrylate, tetraethylene glycol diamethacrylate , divinyl sulfone, divinyl benzene, 1,3,5-Triallyl-1,3,5-triazine-2,4,6 (1H,3H,5H)-trione 98%, and ethylene glycol divinyl ether.

The monomers as referred to herein are charged or uncharged vinyl, acrylic or methacrylic monomeric species.

Non-limiting examples of monomers with a positive charge that can be used in embodiments of the disclosure can include, but are not limited to, 2-(dimethylamino)ethyl hydrochloride acrylate, [2-(acryloyloxy)ethyl]trimethylammonium chloride, 2-aminoethyl methacrylate hydrochloride, N-(3-aminopropyl) methacrylate hydrochloride, 2-(dimethylamino)ethyl methacrylate hydrochloride, [3-(methacryloylamino)propyl]trimethylammonium chloride solution, [2-(methacryloyloxy)ethyl]trimethylammonium chloride, acrylamidopropyl trimethylammonium chloride, 2-aminoethyl methacrylamide hydrochloride, N-(2-aminoethyl) methacrylamide hydrochloride, N-(3-aminopropyl)-methacrylamide hydrochloride, diallyldimethylammonium chloride, allylamine hydrochloride, vinyl imidazolium hydrochloride, vinyl pyridinium hydrochloride, and vinyl benzyl trimethyl ammonium chloride, either individually or in combinations of two or more thereof. In a particular embodiment, the monomer with positive charge includes acrylamido propyl trimethylammonium chloride (APTAC). It should be appreciated that some monomers with a positive charge listed above, comprise a quaternary ammonium group and are naturally charged while other monomers with a positive charge such as comprising primary, secondary and tertiary amines are adjusted to create charge by treatment with an acid. Monomers which can be positively charged, either naturally or by treatment, can be polymerized and cross-linked with a cross-linker to form a coating on the porous membrane.

Examples of monomers with negative charges that can be used can include, but are not limited to, 2-ethylacrylic acid, acrylic acid, 2-carboxy ethyl acrylate, 3-sulfopropyl acrylate potassium salt, 2-propyl acrylic acid, 2-(trifluoromethyl) acrylic acid, methacrylic acid, 2-methyl-2-propene-1-sulfonic acid sodium salt, mono-2-(methacryloyloxy)ethyl maleate, 3-sulfopropyl methacrylate potassium salt, 2-acrylamido-2-methyl-1-propanesulfonic acid, 3-methacrylamido phenyl boronic acid, vinyl sulfonic acid, and vinyl phosphonic acid, either individually or combinations of two or more thereof. In a particular embodiment, the monomer with negative charge includes sulfonic acid moieties. It should be appreciated that some monomers with a negative charge listed above, comprise a strong acid group and are naturally charged while other monomers with a negative charge comprising weak acids are adjusted to create charge by treatment with base. Monomers which are negatively charged either naturally or by treatment can be polymerized and cross-linked with a cross-linker to form a coating on a porous membrane that is negatively charged in an organic solvent.

Examples of neutral monomers that can be used can include, but are not limited to, acryl amide, N,N dimethyl acrylamide, N-(hydroxyethyl)acrylamide, diacetone acrylamide, N-[tris(hydroxymethyl)methyl]acrylamide, N-(isobutoxymethyl)acrylamide, N-(3-methoxypropyl) acrylamide, 7-[4-(trifluoromethyl)coumarin]acrylamide, N-isopropyl acrylamide, 2-(dimethylamino)ethyl acrylate, 1,1,1,3,3,3-hexafluoroisopropyl acrylate, ethyl acrylate, 2-hydroxyethyl acrylate, butyl acrylate, ethylene glycol methyl ether acrylate, 4-hydroxybutyl acrylate, hydroxypropyl acrylate, 4-acetoxyphenethyl acrylate, benzyl acrylate, 1-vinyl-2-pyrrolidinone, vinyl acetate, ethyl vinyl ether, vinyl 4-tert-butylbenzoate, and phenyl vinyl sulfone.

The photo-initiators are, in one embodiment, chosen from those recognized as Type I photo-initiators. Without wishing to be bound by theory, the type I photoinitiator undergoes a unimolecular bond cleavage upon irradiation to yield free radicals. Examples of suitable initiators include various persulfate salts, such as sodium persulfate and potassium persulfate, 1-hydroxycyclohexyl phenyl ketone, sold under the mark Irgacure 2959 (2-Hydroxy-4'-(2-hydroxyethoxy)-2-methylpropiophenone), and benzoyl peroxide.

The amount of photoinitiator in the monomer solution can be any amount (i.e., concentration) which is sufficiently high to affect the desired free-radical reaction between the cross-linker(s) and monomer(s). Examples of useful amounts of photoinitiator in the monomer solution may be in a range of up to 1 weight percent, e.g., from 0.1 or 0.5 to 4.5 weight percent, or from 1 or 2 to 3 or 4 weight percent.

The type of solvent used for the monomer solution can be any that is effective to allow the monomer solution to dissolve and deliver a useful amount of monomer to surfaces of the hydrophilic polymer. The preferred solvent for the monomer solution is water or water with the addition of an organic solvent. The solvent can include organic solvent, water, or both. Examples of organic solvents include alcohols, especially lower alcohols (for example, $C_1$ to $C_6$ alcohols), with isopropanol, methanol, and hexylene glycol being useful examples. The specific solvent used for a particular process, monomer solution, and monomer, can be based on factors such as the type and amount of monomer in the monomer solution, the type of hydrophilic polymer, and other factors. In a solvent that contains both water and organic solvent, the organic solvent may be included in any amount, e.g., in an amount that is less than 90, 75, 50, 40, 30, 20, or 10 percent by weight; as an example, a useful solvent composition may contain from 1 to 10 percent by weight hexylene glycol in water. In one embodiment, the water is deionized water.

The amount of monomer in the monomer solution is in certain embodiments, about 0.5 to 5 weight %, based on the weight of the solution. The amount of crosslinker in the monomer solution is, in certain embodiments, about 0.25 to 3.0 weight %, based on the total weight of the monomer solution. In certain embodiments, the relative amounts of monomer and crosslinker utilized, along with the relative coverage of such ultimate crosslinked or free-radical polymerized coating (upon the hydrophobic membrane coated with a polyamide) is such that the overall, i.e., resulting membrane will have a surface energy of about 30 to 85 dynes/cm.

After the monomer solution has been effectively contacted or coated onto the underlying porous hydrophobic membrane, coated with the polyamide, the resulting membrane is exposed to electromagnetic radiation, typically within the ultraviolet portion of the spectrum, or to another energy source that is effective to cause the photoinitiator to initiate free radical polymerization of the crosslinker and monomer.

As noted above, in a fourth aspect, the disclosure provides a porous filter membrane comprising a polyamide polymer which is soluble in a mixture of formic acid and dichloromethane, which membrane is thereafter coated with the free-radical reaction product of (i) at least one crosslinker; and (ii) at least one monomer, in the presence of a photoinitiator. Such membranes can be prepared using the membranes of the first aspect as starting materials and then performing the acrylic coating step as recited above in the third aspect.

In certain embodiments, the surface energy is greater than about 30, from about 30 to about 100, or about 30 to about 85, or about 30 to about 65 dynes/cm.

In certain embodiments, said membrane has a bubble point of about 20 to about 200 psi, when measured using ethoxy-nonafluorobutane HFE 7200 at a temperature of about 22° C., and/or said membrane has the capacity to bind Ponceau S dye of between about 1 and about 30 $\mu$g/cm$^2$ and the capacity to bind methylene blue dye (MB DBC) of between about 1 and about 30 $\mu$g/cm$^2$. In certain embodiments, the membrane has an isopropanol flowtime of about 150 to about 20,000 seconds/500 mL, measured at 14.2 psi.

As noted above, in a fifth aspect, the disclosure provides porous membranes having certain pendant ionic moieties. In particular, in this aspect the disclosure provides two embodiments:

a. a porous filter membrane comprising a polyamide polymer which is soluble in a mixture of formic acid and dichloromethane, wherein said membrane is grafted with pendant hydrophilic groups chosen from hydroxyl groups, amine groups, carboxylic groups, or combinations thereof; and pendant ionic groups that are different from the pendant hydrophilic groups; and b. a porous composite filter membrane comprising a porous hydrophobic polymeric filter membrane having coated thereon a coating, wherein said coating is a polyamide polymer which is soluble in a blend of formic acid and dichloromethane, thereby providing a polyamide-coated membrane, which membrane is thereafter grafted with pendant hydrophilic groups chosen from hydroxyl groups, amine groups, carboxylic groups, or combinations thereof; and pendant ionic groups that are different from the pendant hydrophilic groups.

In one embodiment of this fifth aspect of the disclosure, the polyamides possess the general repeat unit —[(CH$_2$)$_x$C (O)NH]$_n$—, wherein x is an integer of from about 8 to 12, and n represents the number of repeat units in the polyamide polymer. In certain embodiments, the polyamide polymer is chosen from Nylon 11 and Nylon 12 or blends thereof.

In this fifth aspect of the disclosure, embodiment a., the method for preparing such membranes comprises:

a. contacting the membrane of the second aspect above, with a photoinitiator solution comprising solvent and photoinitiator, to place the photoinitiator at surfaces of the polyamide polymer;

b. after contacting the surfaces with the photoinitiator solution to place the photoinitiator at the surfaces, contacting the surfaces with a monomer solution comprising charged monomer, wherein the charged monomer comprises ionic groups; and c. exposing the surfaces to electromagnetic radiation to cause the ionic groups to become grafted to the polyamide polymer.

In this embodiment a., the membrane is thus a polyamide soluble in a mixture of formic acid and dichloromethane (for example a 1:1, volume:volume mixture), which in certain embodiments is chosen from Nylon 11 and Nylon 12, which has been coated with the free radical reaction product of the crosslinker and acrylamide monomer as described in the third aspect above.

In certain embodiments, said membrane has a bubble point of about 20 to about 200 psi, when measured using ethoxy-nonafluorobutane HFE 7200 at a temperature of about 22° C., and/or said membrane has the capacity to bind Ponceau S dye of between about 1 and about 300 μg/cm$^2$ and the capacity to bind methylene blue dye (MB DBC) of between about 1 and about 300 μg/cm$^2$. In certain embodiments, the membrane has an isopropanol flowtime of about 150 to about 20,000 seconds/500 mL, measured at 14.2 psi.

In the fifth aspect, embodiment b., the method for preparing such membranes comprises:

a. contacting the membrane of the first aspect as set forth above, with a photoinitiator solution comprising solvent and photoinitiator, to place the photoinitiator at surfaces of the polyamide polymer;

b. after contacting the surfaces with the photoinitiator solution to place the photoinitiator at the surfaces, contacting the surfaces with a monomer solution comprising charged monomer, wherein the charged monomer comprises ionic groups; and c. exposing the surfaces to electromagnetic radiation to cause the ionic groups to become grafted to the polyamide polymer.

In this embodiment b., the membrane is thus a porous hydrophilic polymeric membrane, such as ultrahigh molecular weight polyethylene, which has been coated with a polyamide which soluble in a mixture of formic acid and dichoromethane, (for example in a 50/50 proportion (by volume)) which polyamide in certain embodiments is chosen from Nylon 11 and Nylon 12, and thereafter grafted with certain pendant ionic groups.

In certain embodiments, said membrane has a bubble point of about 20 to about 200 psi, when measured using ethoxy-nonafluorobutane HFE 7200 at a temperature of about 22° C., and/or said membrane has the capacity to bind Ponceau S dye of between about 1 and about 300 μg/cm$^2$ and the capacity to bind methylene blue dye (MB DBC) of between about 1 and about 300 μg/cm$^2$. In certain embodiments, the membrane has an isopropanol flowtime of about 150 to about 20,000 seconds/500 mL, measured at 14.2 psi.

With regard to this fifth aspect, applicant has determined that chemically attaching charged ("ionic") chemical groups to a hydrophilic polymer by certain chemical grafting techniques that include the use of photoinitiator, involves certain specific technical challenges. Many of these techniques involve contacting a polymer surface with a solution that contains a charged reactive compound (e.g., "charged monomer") and photoinitiator, then exposing the polymer and the solution to electromagnetic radiation. The charged monomer includes a reactive moiety (e.g., an unsaturated moiety) and the charged chemical group that is to be chemically attached to the polymer. When the solution that contains the charged monomer, the polymer, and the photoinitiator, is exposed to the radiation, the photoinitiator initiates a chemical reaction between the unsaturated moiety and the hydrophilic polymer. The reaction results in the unsaturated moiety becoming chemically attached to the polymer, i.e., "grafted" to the polymer.

In this fifth aspect, the ionic group can be any group. The pendant ionic groups are different from the pendant hydrophilic groups. In particular embodiments in which the hydrophilic polymer is included in a filter membrane, the ionic group can be effective to improve the filtering performance of the filter membrane, especially the non-sieving filtering performance of the filter membrane. Examples of ionic groups that can be included on hydrophilic polymer as described, in particular on a hydrophilic polymer that is included in a filter membrane, include: cationic nitrogen-containing ionic groups, anionic sulfur-containing ionic groups, and anionic phosphorus-containing ionic groups, including chemical counterparts thereof (e.g., salts or acids). As certain particular examples, the pendant ionic group may be a cationic nitrogen-containing cyclic aromatic group, a cationic imidazole or a cationic amine, or an anionic phosphonic acid group or anionic sulfonic acid group.

Certain particular technical challenges exist when these techniques are used to attach a charged monomer onto a hydrophilic polymer. Typical photoinitiators (e.g., benzophenone and benzophenone derivatives) are hydrophobic and are not inherently attracted to hydrophilic surfaces of a hydrophilic polymer. The challenge that results is to place an effective amount of the hydrophobic photoinitiator at a surface of a hydrophilic polymer.

Disclosed herein are techniques by which charged monomers can be chemically attached to, i.e., grafted to, hydrophilic polymer or an article that is made from the hydrophilic polymer (including but not limited a porous filter membrane). The techniques include, generally: placing photoinitiator at a surface of a hydrophilic polymer; then placing charged monomer at the surface; and then exposing the photoinitiator and the charged monomer present at the surface of the hydrophilic polymer to radiation. The radiation causes the photoinitiator to initiate a reaction between the unsaturated moiety and the hydrophilic polymer whereby the unsaturated moiety becomes chemically attached to, i.e., "grafted" to, the polymer, so that the resultant hydrophilic polymer includes the charged (ionic) chemical group chemically attached to the hydrophilic polymer through a covalent chemical bond.

A more specific example of this method involves grafting ionic groups onto a porous filter membrane (e.g., a hydrophilic porous filter membrane) that is made to include hydrophilic polymer. The method includes chemically attaching the charged chemical groups of the charged monomers to hydrophilic polymeric surfaces of the filter membrane, including in certain embodiments at inner pore surfaces of the membrane. The method can include: contacting the filter membrane with photoinitiator solution that contains solvent and photoinitiator to place the photoinitiator at surfaces of the hydrophilic polymer, including inner pore surfaces; optionally removing an excess amount of the photoinitiator solution from the surfaces, e.g., by a rinsing (with water) step, a drying (solvent evaporation) step, or both a rinsing step and a drying step; after contacting the surface with the photoinitiator solution and after optionally removing excess photoinitiator solution from the surface, placing charged monomer at the surfaces; and exposing the surfaces (with photoinitiator and charged monomer) to electromagnetic radiation to cause the charged monomer to react with the hydrophilic polymer and become chemically attached to the hydrophilic polymer through a covalent chemical bond, i.e., grafted to the hydrophilic polymer.

As compared to certain previous grafting methods, the present description involves using hydrophobic photoinitiator to chemically attach charged (ionic) chemical groups to polymer that is hydrophilic. As used herein, the term "hydrophilic," for describing hydrophilic polymer, refers to polymers that attract water molecules due to the presence of a sufficient amount of hydrophilic pendant functional groups attached to the polymeric backbone, such as hydroxyl (—OH) groups, carboxyl groups (—COOH), amino groups, (—NH₂), or similar functional groups that are attached to a polymer backbone. In some embodiments the pendent hydrophilic groups are selected from the group consisting of hydroxyl groups, amine groups, carboxylic groups, or combinations thereof. When a hydrophilic polymer is formed into a porous filter membrane, these hydrophilic groups assist in absorbing water onto the porous filter membrane.

According to methods as described for this fifth aspect, photoinitiator is placed at surfaces of hydrophilic polymer, e.g., at surfaces of a porous filter membrane or other article that contains hydrophilic polymer. By preferred techniques, photoinitiator can be dissolved in solvent to form a photoinitiator solution that is then applied to the hydrophilic polymer, to place the photoinitiator at the surfaces. The photoinitiator may be dissolved in liquid solvent, which may be water, organic solvent, or a combination of organic solvent and water, to form a photoinitiator solution. The photoinitiator solution is then brought into contact with the polymer in any useful manner such as by spraying, submerging, soaking, adsorbing, or the like.

The solvent of the photoinitiator solution can be any solvent that is effective to dissolve the photoinitiator and deliver the photoinitiator to surfaces of the hydrophilic polymer, e.g., to surfaces of a hydrophilic porous polymeric membrane. For a polymer that is hydrophilic, and a photoinitiator that is hydrophobic, the solvent must be compatible with each of these two components to successfully bring a desirably high amount of the hydrophobic photoinitiator into contact with surfaces of the hydrophilic polymer, including into contact with internal pores of a filter membrane made with hydrophilic polymer. To accomplish this, solvent of example photoinitiator solutions as described may contain at least some amount of water, while still being capable of dissolving a useful amount of the photoinitiator. Including water as part of the photoinitiator solvent can be effective to make the solvent more polar, which can make the delivery of (e.g., precipitation of) the hydrophobic photoinitiator from the solvent, onto the hydrophilic polymer, more efficient. Additionally, the water may improve the web handling of the membrane during the process, because exposing a hydrophilic polymer such as nylon to more concentrated, e.g., pure, organic solvent may tend to cause deformation of the polymeric membrane during handling.

The term "solvent" refers to any liquid that is effective to contain a useful amount of dissolved photoinitiator, to allow the liquid to carry the dissolved photoinitiator to surfaces of a hydrophilic polymer or article made to include hydrophilic polymer, e.g., a polymeric filter membrane including inner pore surfaces. The solvent can include organic solvent, water, or both. Examples of organic solvents include alcohols, especially lower alcohols ($C_1$ to $C_4$ alcohols), with isopropanol and methanol being useful examples.

Exemplary solvents for a photoinitiator solution include, consist of, or consist essentially of a mixture of organic solvent and water, for example a blend of water and a lower ($C_1$-$C_4$) alcohol, such as a blend of methanol and water or a blend of isopropanol and water. Combinations of a lower alcohol such as isopropanol or methanol, with water, may be particularly effective in dissolving a hydrophobic initiator, e.g., benzophenone (or a derivative thereof), while still being highly effective for wetting surfaces of hydrophilic polymer such as surfaces (including interior pore surfaces) of a porous filter membrane made with hydrophilic polymer. The effectiveness of these solvent mixtures to dissolve hydrophobic photoinitiator (e.g., benzophenone or a derivative thereof), and to wet a hydrophilic substrate, can allow the solvent mixtures to be used to effectively deliver a useful amount of hydrophobic photoinitiator onto surfaces of a hydrophilic polymer, including internal pore surfaces of a porous hydrophilic filter membrane. The relative amounts of organic solvent (e.g., lower alcohol such as methanol, isopropanol, or a mixture thereof) and water in the solvent may be any effective amounts, for example a ratio (wt:wt) of water:organic solvent may be in a range from 10:90 to 90:10, 20:80 to 80:20, e.g., from 30:70 to 70:30, or from 40:60 to 60:40.

In this fifth aspect, the photoinitiator can be any photoinitiator that will effectively respond to radiation (e.g., ultraviolet radiation) to initiate a reaction between a reactive group of a charged monomer as described herein, and hydrophilic polymer. Examples include photoinitiators known in the chemical arts as "type II" photoinitiators. Known and useful examples of type II photoinitiators include benzophenone and benzophenone derivatives.

The amount of photoinitiator in a photoinitiator solution can be any amount (concentration) that is sufficiently high to allow the photoinitiator solution to deliver a desired, useful, or maximum amount of the photoinitiator to a hydrophilic polymer surface. The amount and its method of application should be sufficient to place an amount of photoinitiator at the polymer surface that is effective for reacting a desirably high amount of the charged monomer with the polymer surface. Examples of useful amounts of photoinitiator in a photoinitiator solution may be in a range of up to 5 weight percent, e.g., from 0.1 or 0.5 to 4.5 weight percent, or from 1 or 2 to 3 or 4 weight percent.

The photoinitiator solution can be applied to surfaces of hydrophilic polymer by any useful technique, such as by spraying the photoinitiator solution onto the hydrophilic polymer, by submerging or soaking the hydrophilic polymer in the photoinitiator solution, or the like. Desirably, the entire surface of an article that includes the hydrophilic polymer can be contacted with and wetted by the photoinitiator solution, including for example all internal surfaces of a porous filter membrane. If necessary, the application step may include manipulation of the hydrophilic polymer or an article that includes the hydrophilic polymer, e.g., by rolling or squeezing a porous filter medium to cause wetting of all surfaces of the porous filter medium. In some embodiments, the photoinitiator solution comprises from 0.1 to 2 weight percent benzophenone or benzophenone derivative, water and one or more of isopropanol and methanol. In some embodiments, the photoinitiator solution comprises from 20 to 80 parts by weight isopropanol, and from 80 to 20 parts by weight percent isopropanol, based on 100 parts by weight total isopropanol and water.

Subsequently, if desired, a portion of the photoinitiator solution residing on the surface of the hydrophilic polymer surface may be removed, while still effectively leaving a desired amount of the photoinitiator solution on the surface. The photoinitiator solution may be present in an amount that is more than necessary, and an excess amount may be removed by any one or more techniques of mechanical removal. For a porous filter membrane, examples of techniques for removing excess photoinitiator solution include drip-drying, squeezing, wringing, folding, or rolling the filter membrane, using mechanical force or pressure such as a roller, rinsing with a spray or water bath (e.g., with deionized water), or by evaporating solvent from the photoinitiator solution that is present on the hydrophilic polymer surface by use of one or more of airflow or heat, e.g., by use of a fan or an "air-knife" dryer, heat, or a combination of these.

By one optional step of removing excess photoinitiator solution, the hydrophilic polymer, e.g., porous hydrophilic filter membrane, that includes photoinitiator solution contacting surfaces thereof may be rinsed using water, e.g., deionized water. The rinsing step may be performed by any useful technique, such as by spraying rinse (e.g., deionized) water onto the hydrophilic polymer, by submerging or soaking the hydrophilic polymer water (e.g., deionized water), or the like, whereby at least a portion of excess photoinitiator solution (including organic solvent thereof) is removed from the hydrophilic polymer surface. The rinse step should allow for a useful amount of the photoinitiator to remain at surfaces of the hydrophilic polymer, preferably with a reduced amount of solvent from the photoinitiator solution remaining on the surfaces.

In a different optional step of removing a portion of photoinitiator solution from surfaces of hydrophilic monomer, which may optionally be performed after a rinsing step or a mechanical drying step or both, the hydrophilic polymer (e.g., a porous hydrophilic filter membrane) having photoinitiator solution contacting surfaces thereof can be treated to remove solvent of the photoinitiator solution by drying the solvent by evaporation, to leave a concentrated amount of the photoinitiator at the hydrophilic polymer surface. This type of drying step, to evaporate solvent of the photoinitiator solution at surfaces of the hydrophilic polymer, can be performed by applying heat to the photoinitiator solution, by passing a flow of air or another gaseous fluid over the photoinitiator solution, or by allowing the solvent to evaporate from the photoinitiator solution by resting at ambient conditions, e.g., in air at room temperature, for an amount of time that is effective to allow a desired portion of the solvent of the photoinitiator solution to evaporate. Desirably, a substantial portion of the solvent can be evaporated and removed from the photoinitiator solution, such as at least 40, 50, 70, or 90 weight percent of the solvent. As a result, a concentrated amount of the photoinitiator remains on surfaces of the hydrophilic polymer, preferably in a fairly uniform distribution over the entire surface, e.g., including at interior pores of a porous filtration membrane.

Optionally, as desired, after a drying step hydrophilic polymer having photoinitiator present at surfaces thereof may be again wetted with water, e.g., deionized water, such as by spraying deionized water on the hydrophilic polymer, submerging the hydrophilic polymer in deionized water, or by any other technique that is effective to re-wet the photoinitiator without removing the photoinitiator from the surfaces of the hydrophilic polymer.

According to methods as described in this fifth aspect, a next step, following placing photoinitiator at surfaces of the hydrophilic polymer (with optional drying or wetting steps), can be to place charged monomer at the surfaces in combination with the photoinitiator. The charged monomer can be placed at the surfaces, having the photoinitiator previously placed thereon, by any useful technique, with useful examples including by contacting the surfaces with monomer solution that contains the charged monomer dissolved in solvent. Specific examples of these techniques include spraying, submerging, soaking, adsorbing, or the like. After the charged monomer is successfully placed at the surfaces in combination with the photoinitiator, the surfaces (with photoinitiator and charged monomer) are exposed to radiation to initiate a chemical reaction that chemically attaches (through a covalent chemical bond) the charged monomer to the hydrophilic polymer, a process often referred to as chemical "grafting."

In this fifth aspect, the charged monomer may be a reactive compound that includes a reactive moiety such as an unsaturated moiety (e.g., vinyl, acrylate, methacrylate, etc.) and an ionic moiety, which may be anionic or cationic.

Examples of suitable cationic charged monomers include acrylate, methacrylate, acrylamide, methacrylamide, amine (e.g., primary amine, secondary amine, tertiary amine, and quaternary amine), and vinyl types having a quaternary ammonium, imidazolium, phosphonium, guanidinium, sulfonium, or pyridinium functionality. Examples of suitable acrylate monomers include 2-(dimethylamino)ethyl hydrochloride acrylate and [2-(acryloyloxy)ethyl]trimethylammonium chloride. Examples of suitable methacrylate monomers include 2-aminoethyl methacrylate hydrochloride, N-(3-aminopropyl) methacrylate hydrochloride, 2-(dimethylamino)ethyl methacrylate hydrochloride, [3-(methacryloylamino)propyl]trimethylammonium chloride solution, and [2-(methacryloyloxy)ethyl]trimethylammonium chloride. Examples of suitable acrylamide monomers include acrylamidopropyl trimethylammonium chloride. Examples of suitable methacrylamide monomers include 2-aminoethyl methacrylamide hydrochloride, N-(2-aminoethyl) methacrylamide hydrochloride, and N-(3-Aminopropyl)-methacrylamide hydrochloride. Other suitable monomers include diallyldimethylammonium chloride, allylamine hydrochloride, vinyl imidazolium hydrochloride, vinyl pyridinium hydrochloride and vinyl benzyl trimethyl ammonium chloride.

Suitable anionic monomers include acrylate, methacrylate, acrylamide, methacrylamide and vinyl types having a sulfonic acid, carboxylic acid, phosphonic acid or phosphoric acid functionality. Examples of suitable acrylate monomers include 2-ethylacrylic acid, acrylic acid, 2-carboxyethyl acrylate, 3-sulfopropyl acrylate potassium salt, 2-propyl acrylic acid, and 2-(trifluoromethyl)acrylic acid. Examples of suitable methacrylate monomers include methacrylic acid, 2-methyl-2-propene-1-sulfonic acid sodium salt, mono-2-(methacryloyloxy)ethyl maleate, and 3-sulfopropyl methacrylate potassium salt. An example of a suitable acrylamide monomer is 2-acrylamido-2-methyl-1-propanesulfonic acid. An example of a suitable methacrylamide monomer is 3-methacrylamido phenyl boronic acid. Other suitable monomers include vinyl sulfonic acid (or vinylsulfonic acid sodium salt) and vinyl phosphonic acid (and salts thereof).

Other suitable monomers are N-(hydroxymethyl)acrylamide (HMAD), (3-acrylamidopropyl)trimethylammonium chloride (APTAC), and (vinylbenzyl)trimethylammonium chloride (VBTAC).

The type of solvent used for the monomer solution in this fifth aspect can be any that is effective to allow the monomer solution to be dissolved and deliver a useful amount of charged monomer to surfaces of the hydrophilic polymer. The preferred solvent for the monomer solution is water or water with the addition of an organic solvent. The solvent can include organic solvent, water, or both. Examples of organic solvents include alcohols, especially lower alcohols ($C_1$ to $C_6$ alcohols), with isopropanol, methanol, and hexylene glycol being useful examples. The specific solvent used for a particular process, monomer solution, and charged monomer, can be based on factors such as the type and amount of charged monomer in the monomer solution, the type of hydrophilic polymer, and other factors. In a solvent that contains both water and organic solvent, the organic solvent may be included in any amount, e.g., in an amount that is less than 90, 75, 50, 40, 30, 20, or 10 percent by weight; as an example, a useful solvent composition may contain from 1 to 10 percent by weight hexylene glycol in water.

The amount of charged monomer in a monomer solution can be any amount (concentration) that is sufficiently high to allow the monomer solution to deliver a desired, useful, or maximum amount of the charged monomer to the hydrophilic polymer surface. The amount of monomer solution, the concentration of charged monomer in the monomer solution, and the method used to apply the monomer solution to the hydrophilic polymer, should be sufficient to place an amount of charged monomer at the polymer surface that is effective for reacting a desirably high amount of the charged monomer with the hydrophilic polymer surface. Examples of useful amounts of monomer in a monomer solution may be in a range of up to 5 or 10 weight percent, e.g., from 0.5 to 5 weight percent or from 1 or 2 to 3 or 4 weight percent. In some embodiments, the charged monomer comprises vinyl imidazole, 2-acrylamido-2-methylpropane sulfonic acid, (3-acrylamido propyl)trimethyl ammonium chloride, vinyl sulfonic acid, vinyl phosphonic acid, acrylic acid, (vinylbenzyl)trimethylammonium chloride, or polydiallyldimethylammonium chloride. In some embodiments, the monomer solution comprises from 0.5 to 10 weight percent charged monomer dissolved in from 90 to 99.5 weight percent deionized water, based on total weight monomer solution.

After the monomer solution has been effectively delivered to surfaces of the hydrophilic polymer (that includes the photoinitiator previously placed thereon), the hydrophilic polymer (with photoinitiator and charged monomer at surfaces thereof) is exposed to electromagnetic radiation, typically within the ultraviolet portion of the spectrum, or to another energy source that is effective to cause the photoinitiator to initiate a chemical reaction that results in the reactive moiety of the charged monomer reacting with and becoming chemically (covalently) attached to the hydrophilic polymer.

The amount of ionic groups that can be attached to a hydrophilic polymer, stated in terms of the amount of reactive monomer chemically attached to hydrophilic monomer or a filter medium that contains the hydrophilic monomer, can be any useful amount, e.g., an amount that will be effective to increase a non-sieving filtering function of a hydrophilic filter membrane to which ionic groups are attached. Preferably the presence and amount of the pendant ionic group does not produce a substantial or an un-acceptable level of a detrimental impact on other properties of the filter membrane such as a flow property.

For example hydrophilic polymers, having had ionic groups chemically attached thereto by use of a grafting technique that involves photoinitiator, articles or compositions that include these polymers, such as a filter membrane made with the polymer, may (while not preferred) include a very small yet analytically detectable (residual) amount of photoinitiator.

As noted above, the disclosure provides composite membranes useful as filtration media for removing impurities from various fluids. Due to the nature of the processes, in the various aspects of the disclosure the polyamide coating applied to the hydrophobic filter media or membrane does not completely cover or encapsulate the hydrophobic filter media or membrane, but rather forms a semi-continuous or partial coating on the underlying membrane. Similarly, in the third and fourth aspects of the disclosure, where a free radical polymerization is conducted in the presence of the polyamide-coated membrane or a nylon membrane, the resulting cured or cross-linked polymeric coating does not completely cover or encapsulate the surfaces of the underlying membrane, but again forms a semi-continuous or partial coating on the nylon membrane or polyamide-coated porous hydrophobic membrane structure.

In certain embodiments, the underlying hydrophobic porous polymer filter material is formed from a polymeric material, a mixture of different polymeric materials, or a polymeric material and a non-polymeric material. Polymeric materials forming the filter can be crosslinked together to provide a filter structure with a desired degree of integrity.

Polymeric materials that can be used to form the underlying porous filter membranes of the disclosure are hydrophobic polymers. In some embodiments, the filter membrane includes a polyolefin or a halogenated polymer. Exemplary polyolefins include polyethylene (PE), polypropylene (PP), polymethylpentene (PMP), polybutene (PB), polyisobutylene (PIB), and copolymers of two or more of ethylene, propylene, and butylene. In a further particular embodiment, filter material includes ultrahigh molecular weight polyethylene (UPE). UPE filter materials, such as UPE membranes, are typically formed from a resin having a molecular weight (viscosity average molecular weight) greater than about $1 \times 10^6$ Daltons (Da), such as in the range of about $1 \times 10^6$-$9 \times 10^6$ Da, or $1.5 \times 10^6$-$9 \times 10^6$ Da. Crosslinking between polyolefin polymers such as polyethylene can be promoted by use of heat or crosslinking chemicals, such as peroxides (e.g., dicumyl peroxide or di-tert-butyl peroxide), silanes (e.g. trimethoxyvinylsilane), or azo ester compounds (e.g., 2,2'-azo-bis(2-acetoxy-propane). Exemplary halogenated polymers include polytetrafluoroethylene (PTFE), polychlorotrifluoro-ethylene (PCTFE), fluorinated ethylene polymer (FEP), polyhexafluoropropylene, and polyvinylidene fluoride (PVDF).

In other embodiments, the filter material includes a polymer chosen from polyimides, polysulfones, polyethersulfones, polyarylsulfone polyamides, polyacrylates, polyesters, polyamide-imides, celluloses, cellulose esters, polycarbonates, or combinations thereof.

In another embodiment, the underlying hydrophobic porous filter membrane can be chosen from commercially available hydrophobic membranes such as those prepared from ultra high molecular weight polyethylene, polypropylene, polycarbonate, poly(tetrafluoro ethylene), polyvinylidene fluoride, polyarylsulfones and the like.

Typically, the underlying porous filter membranes are asymmetric. In one example of an asymmetric membrane, the pore size on one face and region of the membrane is larger than on the opposing face and region. In another example, asymmetric structures can exist where the pore size on the opposing faces (and regions) of the membrane are larger while a central region of the membrane has a smaller pore size than either of the faces (e.g., an hourglass). In other versions the microporous membrane can have an essentially symmetric pore structure across its thickness (substantially the same pore size across the thickness of the membrane).

The polyamide polymers, also commonly known as "nylons", referred to above are typically understood to include copolymers and terpolymers that possess recurring amido groups in a polymeric backbone. Generally, nylon and polyamide resins include copolymers of a diamine and a dicarboxylic acid.

The polyamides useful in the practice of the present disclosure are soluble in blends of formic acid and dichloromethane. In one embodiment of such blends, the amount of formic acid varies from about 25 volume percent to about 75 volume percent, while the amount of dichloromethane varies from about 75 to about 25 volume percent. In one embodiment, the blend comprises about 50 volume percent of formic acid and about 50 volume percent of dichloromethane. In one embodiment, the polyamides useful in the present disclosure have the general formula —[(CH$_2$)$_x$C(O)NH]$_n$—, wherein x is an integer of from about 8 to 12, and n represents the number of repeat units in the polyamide structure. Within this embodiment is a resin known as Nylon 11 (CAS No. 9012-03-07). Nylon 11 is commercially available from Arkema under the trademark Rilsan® Polyamide 11. Nylon 11 can be produced by the polymerization of 11-aminoundecanoic acid. Also within this embodiment is the commercially available polyamide known as Nylon 12, in which x is 11 in the above formula. Nylon 12 can be made from ω-aminolauric acid or laurolactam monomers, each which have 12 carbon atoms (CAS No. 24937-16-4).

In certain embodiments of the present disclosure, the polyamides are those generally referred to as Nylon 11 and Nylon 12. Such Nylon polymers are available in a variety of grades, which vary with respect to molecular weight, density, modulus, and melting point. All such polyamides are believed to be soluble in the formic acid/dichloromethane blends referred to above, but generally insoluble in aqueous solutions. Such polyamides are utilized as a dilute solution in formic acid/dichloromethane blends. In one embodiment, the polyamide is utilized in a concentration of about 1 to 4 weight percent in a 50/50 (Vol. %) blend of formic acid and dichloromethane.

In various examples of methods and articles of the present disclosure, the membranes of the disclosure can be included in a porous filter membrane. As used herein, a "porous filter membrane" is a porous solid that contains porous (e.g., microporous) interconnecting passages that extend from one surface of the membrane to an opposite surface of the membrane. The passages generally provide tortuous tunnels or paths through which a liquid being filtered must pass. Any particles contained in this liquid that are larger than the pores are either prevented from entering the microporous membrane or are trapped within the pores of the microporous membrane (i.e., are removed by a sieving-type filtration mechanism) as fluid containing the particles passes through the membrane. Particles that are smaller than the pores are also trapped or absorbed onto the pore structure, e.g., may be removed by a non-sieving filtration mechanism. The liquid and possibly a reduced amount of particles or dissolved materials pass through the microporous membrane.

Example porous polymeric filter membrane as described herein for the various aspects can be characterized by physical features that include pore size, bubble point, and porosity.

The porous polymeric filter membrane may have any pore size that will allow the filter membrane to be effective for performing as a filter membrane, e.g., as described herein, including pores of a size (average pore size) sometimes considered as a microporous filter membrane or an ultrafilter membrane. Examples of useful or preferred porous membranes can have an average pore size in a range on from about 0.001 microns to about 1 or 2 microns, e.g., from 0.01 to 0.8 microns, with the pore size be selected based on one or more factors that include: the particle size or type of impurity to be removed, pressure and pressure drop requirements, and viscosity requirements of a liquid being processed by the filter. An ultrafilter membrane can have an average pore size in a range from 0.001 microns to about 0.05 microns. Pore size is often reported as average pore size of a porous material, which can be measured by known techniques such as by Mercury Porosimetry (MP), Scanning Electron Microscopy (SEM), Liquid Displacement (LLDP), or Atomic Force Microscopy (AFM).

Bubble point is also a known feature of a porous membrane. By a bubble point test method, a sample of porous polymeric filter membrane is immersed in and wetted with a liquid having a known surface tension, and a gas pressure is applied to one side of the sample. The gas pressure is gradually increased. The minimum pressure at which the gas flows through the sample is called a bubble point. To determine the bubble point of a porous material a sample of the porous material is immersed in and wetted with ethoxy-nonafluorobutane HFE 7200 (available from 3M) at a temperature of 20-25 degrees Celsius (e.g., 22 degrees Celsius). A gas pressure is applied to one side of the sample by using compressed air and the gas pressure is gradually increased. The minimum pressure at which the gas flows through the sample is called the bubble point. Examples of useful bubble points of a porous polymeric filter membrane that is useful or preferred according to the present description, measured using the procedure described above can be in a range from about 20 to about 200 psi. A porous polymer filter layer as described may have any porosity that will allow the porous polymer filter layer to be effective as described herein. Example porous polymer filter layers can have a relatively high porosity, for example a porosity of at least 60, 70 or 80 percent. As used herein, and in the art of porous bodies, a "porosity" of a porous body (also sometimes referred to as void fraction) is a measure of the void (i.e., "empty") space in the body as a percent of the total volume of the body, and is calculated as a fraction of the volume of voids of the body over the total volume of the body. A body that has zero percent porosity is completely solid.

A porous polymeric filter membrane as described can be in the form of a sheet or hollow fiber having any useful thickness, e.g., a thickness in a range from 5 to 100 microns, e.g., from 10 or 20 to 50 or 80 microns.

A filter membrane of the present description can be useful with any type of industrial or life sciences process that requires a high purity liquid material as an input. Non-limiting examples of such processes include processes of preparing microelectronic or semiconductor devices, a specific example of which is a method of filtering a liquid process material (e.g., solvent or solvent-containing liquid) used for semiconductor photolithography. Examples of contaminants present in a process liquid or solvent used for preparing microelectronic or semiconductor devices may include metal ions dissolved in the liquid, solid particulates suspended in the liquid, and gelled or coagulated materials (e.g., generated during photolithography) present in the liquid.

The filter membrane can be useful to remove a dissolved or suspended contaminant or impurity from a liquid that is caused to flow through the coated filter membrane, either by a sieving mechanism or a non-sieving mechanism, and preferably by both a combined non-sieving and a sieving mechanism. In the case of the second, third, and fourth aspects of the disclosure, the underlying porous hydrophobic filter membrane itself (before conversion to the composite filter membranes of the disclosure) may exhibit effective sieving and non-sieving filtering properties, and desired flow properties. The composite filter membranes of the disclosure can exhibit comparable sieving filtering properties, useful or comparable (not unduly diminished) flow properties, and improved (e.g., substantially improved) non-sieving filtering properties relative to the underlying hydrophobic polymeric membranes utilized as starting materials.

Particular examples of filter membranes as described can be used to purify a liquid chemical that is used or useful in a semiconductor or microelectronic fabrication application, e.g., for filtering a liquid solvent or other process liquid used in a method of semiconductor photolithography. Some specific, non-limiting, examples of solvents that can be filtered using a filter membrane as described include: n-butyl acetate (nBA), isopropyl alcohol (IPA), 2-ethoxyethyl acetate (2EEA), a xylene, cyclohexanone, ethyl lactate, methyl isobutyl carbinol (MIBC), methyl isobutyl ketone (MIBK), isoamyl acetate, undecane, propylene glycol methyl ether (PGME), and propylene glycol monomethyl ether acetate (PGMEA), and a mixed solution of propylene glycol monomethyl ether (PGME) and PGMEA (7:3). Example filter membranes as described may be effective to remove metals from solvents that contain water, amines, or both, e.g., bases and aqueous bases such as $NH_4OH$, tetramethyl ammonia hydroxide (TMAH) and comparable solutions, which may optionally contain water. In some embodiments liquid including a solvent selected from: tetramethyl ammonium hydroxide (TMAH) or $NH_4OH$ is pass through a filter having a membrane described herein and removes metal from the solvent. In some embodiments, passing the solvent-containing liquid through the membrane to remove metal from the solvent-containing liquid results in a concentration of metal in the solvent-containing liquid being reduced.

The filter membranes of the disclosure can also be characterized in terms of dye-binding capacity of the filter membrane. Specifically, a charged dye can be caused to bind to surfaces of the filtration membrane. The amount of the dye that can be bound to the filtration membrane can be measured quantitatively by spectroscopic methods based on a difference in measured absorption readings of the membrane at an absorption frequency of the dye. The dye-binding capacity can be assessed by use of a negatively charged dye, and also by use of a positively charged dye.

In addition, a filter membrane as described can be characterized by a flow rate or flux of a flow of liquid through the filter membrane. The flow rate must be sufficiently high to allow the filter membrane to be efficient and effective for filtering a flow of fluid through the filter membrane. A flow rate, or as alternately considered, a resistance to a flow of liquid through a filter membrane, can be measured in terms of flow rate or flow time. A filter membrane as described herein, can have a relatively low flow time, preferably in combination with a bubble point that is relatively high, and good filtering performance (e.g., as measured by particle retention, dye-binding capacity, or both). An example of a useful or preferred isopropanol flow time can be below about 20,000 seconds/500 mL, e.g., below about 4,000 or 2,000 seconds/500 mL.

Membrane isopropanol (IPA) flow times as reported herein are determined by Measuring the time it takes for 500 ml of isopropyl alcohol (IPA) fluid to pass through a membrane with an effective surface area of 13.8 cm$^2$ at 14.2 psi, and at a temperature of 21 degrees Celsius.

In certain embodiments, the composite membranes described herein can be approximately equal to or greater than a flow time of the same filter membrane that does not contain the polyamide coating and co-reacted crosslinker/monomer coating. In other words, the creation of the composite membranes from the underlying porous hydrophobic filter membranes does not have a substantial negative impact on the flow properties of the filter membrane, yet may still improve the filtering function of the filter membrane, especially the non-sieving filtering function of the membrane, e.g., as measured by dye-binding capacity, particle retention, or both, depending on the pore size.

Membrane water flow time can be determined by cutting membranes into 47 mm disks and wetting with water before placing the disk in a filter holder attached to a reservoir for holding a volume of water. The reservoir is connected to a pressure regulator. Water is flowed through the membrane under 14.2 psi (pounds per square inch) differential pressure. After equilibrium is achieved, the time for 500 ml of water to flow through the membrane is recorded.

In certain embodiments, the composite membranes of the present disclosure can be approximately equal to and not significantly greater than a flow time of the same filter membrane that does not contain the polyamide coating (second aspect), and co-reacted crosslinker/charged acrylamide monomer coating (third aspect), or the composite membrane of the fourth aspect, embodiment II. In other words, the creation of the composite membranes from the underlying porous hydrophobic filter membranes does not have a substantial negative impact on the flow properties of the filter membrane, yet may still improve the filtering function of the filter membrane, especially the non-sieving filtering function of the membrane, e.g., as measured by dye-binding capacity, particle retention, or both. According to certain filter membranes, a flow time measured of a filter membrane of the present description, can be not more than 30 percent or 20 percent, e.g., not more than 10 percent, 5, or 3 percent different from (e.g., greater than) the flow time of the underlying hydrophobic porous filter membrane.

A filter membrane as described can be contained within a larger filter structure such as a multilayer filter assembly or a filter cartridge that is used in a filtering system. The filtering system will place the filter membrane, e.g., as part of a multi-layer filter assembly or as part of a filter cartridge, in a filter housing to expose the filter membrane to a flow path of a liquid chemical to cause at least a portion of the flow of the liquid chemical to pass through the filter membrane, so that the filter membrane removes an amount of the impurities or contaminants from the liquid chemical. The structure of a multi-layer filter assembly or filter cartridge may include one or more of various additional materials and structures that support the composite filter membrane within the filter assembly or filter cartridge to cause fluid to flow from a filter inlet, through the composite membrane (including the filter layer), and thorough a filter outlet, thereby passing through the composite filter membrane when passing through the filter. The filter membrane supported by the filter assembly or filter cartridge can be in any useful shape, e.g., a pleated cylinder, a cylindrical pad, one or more non-pleated (flat) cylindrical sheets, a pleated sheet, among others.

One example of a filter structure that includes a filter membrane in the form of a pleated cylinder can be prepared to include the following component parts, any of which may be included in a filter construction but may not be required: a rigid or semi-rigid core that supports a pleated cylindrical coated filter membrane at an interior opening of the pleated cylindrical coated filter membrane; a rigid or semi-rigid cage that supports or surrounds an exterior of the pleated cylindrical coated filter membrane at an exterior of the filter membrane; optional end pieces or "pucks" that are situated at each of the two opposed ends of the pleated cylindrical coated filter membrane; and a filter housing that includes an inlet and an outlet. The filter housing can be of any useful and desired size, shape, and materials, and can preferably be made of suitable polymeric material.

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

As one example, FIG. 1 shows filter component 30, which is a product of pleated cylindrical component 10 and end piece 22, with other optional components. Cylindrical component 10 includes a filter membrane 12, as described herein, and is pleated. End piece 22 is attached (e.g., "potted") to one end of cylindrical filter component 10. End piece 22 can preferably be made of a melt-processable polymeric material. A core (not shown) can be placed at the interior opening 24 of pleated cylindrical component 10, and a cage (not shown) can be placed about the exterior of pleated cylindrical component 10. A second end piece (not shown) can be attached ("potted") to the second end of pleated cylindrical component 30. The resultant pleated cylindrical component 30 with two opposed potted ends and optional core and cage can then be placed into a filter housing that includes an inlet and an outlet and that is configured so that an entire amount of a fluid entering the inlet must necessarily pass through filtration membrane 12 before exiting the filter at the outlet.

EXAMPLES

Porosimetry Bubble Point

A porosimetry bubble point test method measures the pressure required to push air through the wet pores of a membrane. A bubble point test is a well-known method for determining the pore size of a membrane. To determine the bubble point of a porous material a sample of the porous material is immersed in and wetted with ethoxy-nonafluorobutane HFE 7200 (available from 3M) at a temperature of 20-25 degrees Celsius (e.g., 22 degrees Celsius). A gas pressure is applied to one side of the sample by using compressed air and the gas pressure is gradually increased.

The minimum pressure at which the gas flows through the sample is called the bubble point.

As used herein, a "surface energy" (surface free energy) of a surface is considered to be equal to a surface tension of highest surface tension liquid that will wet the surface within two seconds of contact (see Example 6, Surface Energy Measurement) (also referred to as a "wetting liquid surface tension" test, or a "standard liquid" test), and generally corresponds to the relative hydrophobicity/hydrophilicity of the surface. In certain embodiments, the membrane will have a surface energy that greater than about 30 dynes per centimeter, measured as a surface tension of a highest surface tension liquid that will wet the surface within two seconds, as described in Example 6.

Example 1

Preparation of 3% Nylon 11 in Mixture of Formic acid and Dichloromethane

A mixture containing 3 weight percent of Nylon 11 was prepared using the following method. First a 1:1 volume ratio of ≥96% formic acid (Sigma-Aldrich) and dichloromethane (Sigma-Aldrich) was prepare by slowly adding 500 mL of ≥96% formic acid to 500 mL of dichloromethane, and the solution was stirred at room temperature. Next 30 grams of Nylon 11 (Sigma-Aldrich) was added to 970 grams of the 1:1 volume ratio mixture of formic acid and dichloromethane. The resulting mixture was gently stirred for 16 hours and resulted in a homogenous solution of 3 weight percent Nylon 11 in a 1:1 mixture of formic acid and dichloromethane.

Example 2

Preparation of an Asymmetric 3 nm UPE Membrane Coated with Nylon 11

A 3 weight percent solution of Nylon 11 in a 1:1 mixture of formic acid and dichloromethane was prepared similarly to Example 1. A sheet of Asymmetric 3 nm UPE Membrane (Entegris) was placed on a sheet of polyethylene and excess solution of 3 weight percent Nylon 11 was dripped onto the membrane and immediately covered with a sheet of polyethylene. The excess solution was removed from the membrane by firmly rolling a rubber roller over the polyethylene sandwich as it laid flat on a table. It was observed that the membrane turned slightly transparent indicating that the membrane was wetted and imbibed with the coating solution. The membrane sheet was removed from the polyethylene sandwich and was restrained in a frame and allowed to dry at room temperature. Prior to coating with Nylon 11 the Asymmetric 3 nm UPE Membrane measured 95 um thick, had an IPA flowtime of 4080 sec/500 mL, an ethoxy-nonafluorobutane HFE 7200 mean bubblepoint of 92 psi, surface energy of 30 Dynes/cm, and Ponceau-S Dye Binding Capacity of 0.0 $\mu$g/cm$^2$. The resulting membrane after coating with Nylon 11 measured 95 um thick, had an IPA flowtime of 5730 sec/500 mL, an HFE mean bubblepoint of 100 psi, surface energy of 48 Dynes/cm, and Ponceau-S Dye Binding Capacity of 9.1 $\mu$g/cm$^2$. The increase in flowtime, bubblepoint, surface energy, and Ponceau-S Dye Binding Capacity indicates that the membrane is coated with Nylon 11.

Example 3

Preparation of an Asymmetric 3 nm UPE Membrane Coated with Nylon 12

A 3 weight percent solution of Nylon 12 in a 1:1 mixture of formic acid and dichloromethane was prepared similarly to Example 1. A sheet of Asymmetric 3 nm UPE Membrane (Entegris) was placed on a sheet of polyethylene and excess solution of 3 weight percent Nylon 12 was dripped onto the membrane and immediately covered with a sheet of polyethylene. The excess solution was removed from the membrane by firmly rolling a rubber roller over the polyethylene sandwich as it laid flat on a table. It was observed that the membrane turned slightly transparent indicating that the membrane was wetted and imbibed with the coating solution. The membrane sheet was removed from the polyethylene sandwich and was restrained in a frame and allowed to dry at room temperature. Prior to coating with Nylon 12 the Asymmetric 3 nm UPE Membrane measured 95 um thick, had an IPA flowtime of 4080 sec/500 mL, an ethoxy-nonafluorobutane HFE 7200 mean bubblepoint of 92 psi, surface energy of 30 Dynes/cm, and Ponceau-S Dye Binding Capacity of 0.0 $\mu$g/cm$^2$. The resulting membrane after coating with Nylon 12 measured 95 um thick, had an IPA flowtime of 4330 sec/500 mL, an ethoxy-nonafluorobutane HFE 7200 mean bubblepoint of 98 psi, surface energy of 45 Dynes/cm, and Ponceau-S Dye Binding Capacity of 4.9 $\mu$g/cm$^2$. The increase in flowtime, bubblepoint, surface energy, and Ponceau-S Dye Binding Capacity indicates that the membrane is coated with Nylon 12.

Example 4

Stability of Coating for Nylon 12 Coated UPE in Comparison to Nylon 6 coated UPE A 3 nm UPE membrane coated with Nylon 12 was prepared similarly to Example 2. A 3 nm UPE membrane coated with Nylon 6 was prepared similarly to Example 2 except the Nylon was Nylon 6 (Sigma-Aldrich) and the solvent consisted of only ≥96% formic acid. To assess the acid stability of the coatings, the resulting membranes where exposed to ≥96% formic acid by rotating them for 24 hours. After 24 hours exposure to ≥96% formic acid, the treated membranes were flushed with de-ionized water until a stable pH was obtained. The stability of the coating was assessed by Fourier-transform infrared spectroscopy (FTIR) and comparing the initial and post formic acid exposed Nylon/UPE peak ratio. The Nylon 6 coated UPE membrane lost 90.2% of its Nylon coating as determined by FTIR analysis, whereas the Nylon 12 coated UPE membrane lost 0.0% of its Nylon 12 coating. This data suggests that UPE membrane coated with Nylon 12 exhibits improved stability to acid exposure in comparison to UPE membrane coated with Nylon 6.

Example 5

Preparation of a Nylon 11 Membrane from a Formic acid and Dichloromethane Solvent System A 6 weight percent solution of Nylon 11 in a 1:1 mixture of formic acid and dichloromethane was prepared similarly to Example 1. The solution was cast onto a glass plate using a film applicator set to 400 um thickness. The cast Nylon 11/formic acid/dichloromethane film was allowed to evaporate at room temperature. This resulted in a white sheet of Nylon 11 membrane that was easily separated from the glass plate. The resulting Nylon 11 membrane was determined to have an IPA mean bubblepoint of 17.2 psi and an IPA flowtime of 550 sec/500 mL.

Example 6

Surface Energy Measurement

A liquid will wet a porous polymeric membrane when the surface tension of the liquid is less than the surface free energy of the membrane. For purposes of this disclosure, a porous membrane is wet by a liquid when the membrane is placed in contact with the highest surface tension liquid within a series of inert (standard) liquids, and the membrane spontaneously wicks a liquid within 2 seconds or less without the application of external pressure.

In a representative example, a series of inert (standard) liquids was prepared by mixing methanol and water at different mass ratios. The surface tension of the resulting liquids is depicted in FIG. 4 (Plotted using surface tension data published in Lange's Handbook of Chemistry 11 edition).

ASPECTS OF THE DISCLOSURE

In a first aspect, the disclosure provides a composite porous filter membrane comprising:

a porous hydrophobic polymeric filter media having a coating thereon, wherein said coating is a polyamide polymer which is soluble in a blend of formic acid and dichloromethane.

In a second aspect, the disclosure provides the membrane of the first aspect, wherein the polyamide polymer possesses a repeat unit structure of the formula —[(CH$_2$)$_x$C(O)NH]$_n$—, wherein x is an integer of from about 8 to 12, and n represents the number of repeat units in the polyamide polymer.

In a third aspect, the disclosure provides the membrane of the first or second aspects, wherein the polyamide polymer is chosen from Nylon 11 and Nylon 12.

In a fourth aspect, the disclosure provides the membrane of any one of the first three aspects, wherein said membrane has the following characteristics:

(i) a surface energy of about 20 to about 100 dynes/cm;

(ii) an isopropanol flowtime of about 150 to about 20,000 seconds/500 mL, measured at 14.2 psi;

(iii) a bubble point of about 20 to about 200 psi, when measured using ethoxy-nonafluorobutane HFE 7200 at a temperature of about 22° C.; and (iv) the capacity to bind Ponceau S dye of between about 1 and about 30-$\mu$g/cm$^2$ and the capacity to bind methylene blue dye (MB DBC) of between about 1 and about 30 $\mu$g/cm$^2$.

In a fifth aspect, the disclosure provides the membrane of any one of the first four aspects, wherein the hydrophobic polymeric filter membrane is chosen from polyethylene, polypropylene, polycarbonate, poly(tetrafluoro ethylene), polyvinylidene fluoride, and polyarylsulfone.

In a sixth aspect, the disclosure provides the membrane of any one of the first five aspects, wherein the hydrophobic polymeric filter media is chosen from ultra high molecular weight polyethylene and poly(tetrafluoro ethylene).

In a seventh aspect, the disclosure provides a porous filter membrane comprising a polyamide polymer which is soluble in a mixture of formic acid and dichloromethane.

In an eighth aspect, the disclosure provides the membrane of the seventh aspect, wherein the polyamide polymer possesses a repeat unit structure of the formula —[(CH$_2$)$_x$C(O)NH]$_n$—, wherein x is an integer of from about 8 to 12, and n represents the number of repeat units in the polyamide polymer.

In a ninth aspect, the disclosure provides the membrane of any of the seventh through the eighth aspects, wherein the polyamide polymer is chosen from Nylon 11 and Nylon 12.

In a tenth aspect, the disclosure provides the membrane of any one of the first through ninth aspects, wherein said membrane has the following characteristics:

an isopropanol flowtime of about 150 to about 20,000 seconds/500 mL, measured at 14.2 psi and a bubble point of about 20 to about 200 psi, when measured using ethoxy-nonafluorobutane HFE 7200 at a temperature of about 22° C.

In an eleventh aspect, the disclosure provides the membrane of any of the seventh through the tenth aspects wherein said membrane has the following characteristics:

the capacity to bind Ponceau S dye of between about 1 and about 100-μg/cm$^2$ and the capacity to bind methylene blue dye (MB DBC) of between about 1 and about 100 μg/cm$^2$.

in a twelfth aspect, the disclosure provides a porous filter membrane comprising a polyamide polymer which is soluble in a mixture of formic acid and dichloromethane, which membrane is thereafter coated with the free-radical reaction product of (i) at least one crosslinker; and (ii) at least one monomer, in the presence of a photo-initiator.

In a thirteenth aspect, the disclosure provides the membrane of the twelfth aspect, wherein the polyamide polymer possesses a repeat unit structure of the formula —[(CH$_2$)$_x$C(O)NH]$_n$—, wherein x is an integer of from about 8 to 12, and n represents the number of repeat units in the polyamide polymer.

In a fourteenth aspect, the disclosure provides the membrane of the twelfth or thirteenth aspects, wherein the polyamide polymer is chosen from Nylon 11 and Nylon 12.

In a fifteenth aspect, the disclosure provides the membrane of the twelfth through the fourteenth aspects, wherein said membrane has the following characteristics:

(i) a surface energy of about 30 to about 100 dynes/cm;

(ii) an isopropanol flowtime of about 150 to about 20,000 seconds/500 mL, measured at 14.2 psi;

(iii) a bubble point of about 20 to about 200 psi, when measured using ethoxy-nonafluorobutane HFE 7200 at a temperature of about 22° C.; and (iv) the capacity to bind Ponceau S dye of between about 1 and 30 μg/cm$^2$ and the capacity to bind methylene blue dye (MB DBC) of between about 1 and about 30 μg/cm$^2$.

In a sixteenth aspect, the disclosure provides the membrane of any of the twelfth through the fifteenth aspects, wherein the crosslinker is chosen from methylene bis(acrylamide), tetraethylene glycol diacrylate, tetraethylene glycol diamethacrylate , divinyl sulfone, divinyl benzene, 1,3,5-Triallyl-1,3,5-triazine-2,4,6(1H,3H,5H)-trione, and ethylene glycol divinyl ether.

In a seventeenth aspect, the disclosure provides the membrane of any of the twelfth through the fifteenth aspects, wherein the monomer is chosen from 2-(dimethylamino) ethyl hydrochloride acrylate, [2-(acryloyloxy)ethyl]trimethylammonium chloride, 2-aminoethyl methacrylate hydrochloride, N-(3-aminopropyl) methacrylate hydrochloride, 2-(dimethylamino)ethyl methacrylate hydrochloride, [3-(methacryloylamino)propyl]trimethylammonium chloride solution, [2-(methacryloyloxy)ethyl]trimethyl ammonium chloride, acrylamidopropyl trimethylammonium chloride, 2-aminoethyl methacrylamide hydrochloride, N-(2-aminoethyl) methacrylamide hydrochloride, N-(3-aminopropyl)-methacrylamide hydrochloride, diallyldimethylammonium chloride, allylamine hydrochloride, vinyl imidazolium hydrochloride, vinyl pyridinium hydrochloride, vinyl benzyl trimethyl ammonium chloride, and acrylamido propyl trimethylammonium chloride, 2-ethylacrylic acid, acrylic acid, 2-carboxy ethyl acrylate, 3-sulfopropyl acrylate potassium salt, 2-propyl acrylic acid, 2-(trifluoromethyl)acrylic acid, methacrylic acid, 2-methyl-2-propene-1-sulfonic acid sodium salt, mono-2-(methacryloyloxy)ethyl maleate, 3-sulfopropyl methacrylate potassium salt, 2-acrylamido-2-methyl-1-propanesulfonic acid, 3-methacrylamido phenyl boronic acid, vinyl sulfonic acid, and vinyl phosphonic acid.

In an eighteenth aspect, the disclosure provides the membrane of any of the twelfth through the fifteenth aspects, wherein the monomer is chosen from 2-ethylacrylic acid, acrylic acid, 2-carboxy ethyl acrylate, 3-sulfopropyl acrylate potassium salt, 2-propyl acrylic acid, 2-(trifluoromethyl) acrylic acid, methacrylic acid, 2-methyl-2-propene-1-sulfonic acid sodium salt, mono-2-(methacryloyloxy)ethyl maleate, 3-sulfopropyl methacrylate potassium salt, 2-acrylamido-2-methyl-1-propanesulfonic acid, 3-methacrylamido phenyl boronic acid, vinyl sulfonic acid, and vinyl phosphonic acid.

In a nineteenth aspect, the disclosure provides the membrane of any one of twelfth through the fifteenth aspects, wherein the monomer is chosen from acryl amide, N,N dimethyl acrylamide, N-(hydroxyethyl)acrylamide, diacetone acrylamide, N-[tris(hydroxymethyl)methyl]acrylamide, N-(isobutoxymethyl)acrylamide, N-(3-methoxypropyl) acrylamide, 7-[4-(trifluoromethyl)coumarin]acrylamide, N-isopropyl acrylamide, 2-(dimethylamino)ethyl acrylate, 1,1,1,3,3,3-hexafluoroisopropyl acrylate, ethyl acrylate, 2-hydroxyethyl acrylate, butyl acrylate, ethylene glycol methyl ether acrylate, 4-hydroxybutyl acrylate, hydroxypropyl acrylate, 4-acetoxyphenethyl acrylate, benzyl acrylate, 1-vinyl-2-pyrrolidinone, vinyl acetate, ethyl vinyl ether, vinyl 4-tert-butylbenzoate, and phenyl vinyl sulfone.

In a twentieth aspect, the disclosure provides porous hydrophobic polymeric filter membrane having coated thereon a polyamide coating as a first coating, wherein said coating is a polyamide polymer which is soluble in a blend of formic acid and dichloromethane, thereby providing a polyamide-coated membrane, wherein said polyamide-coated membrane has a second coating thereon, which is the free-radical reaction product of (i) at least one crosslinker; and (ii) at least one monomer, in the presence of a photo-initiator.

In a twenty-first aspect, the disclosure provides the membrane of the twentieth aspect, wherein the polyamide polymer possesses a repeat unit structure of the formula —[(CH$_2$)$_x$C(O)NH]$_n$—, wherein x is an integer of from about 8 to 12, and n represents the number of repeat units in the polyamide polymer.

In a twenty-second aspect, the disclosure provides the membrane of the twentieth aspect, wherein the polyamide polymer is chosen from Nylon 11 and Nylon 12.

In a twenty-third aspect, the disclosure provides the membrane of the twentieth or twenty-first aspect, wherein said membrane has the following characteristics:

(i) a surface energy of about 30 to about 100 dynes/cm;

(ii) an isopropanol flowtime of about 150 to about 20,000 seconds/500 mL, measured at 14.2 psi;

(iii) a bubble point of about 20 to about 200 psi, when measured using ethoxy-nonafluorobutane HFE 7200 at a temperature of about 22° C.; and (iv) the capacity to bind Ponceau S dye of between about 1 and about 30-μg/cm² and the capacity to bind methylene blue dye (MB DBC) of between about 1 and about 30 μg/cm².

In a twenty-fourth aspect, the disclosure provides the membrane of the twentieth, twenty-first, twenty-second, or twenty-third aspects, wherein the hydrophobic polymeric filter membrane is chosen from polyethylene, polypropylene, polycarbonate, poly(tetrafluoro ethylene), polyvinylidene fluoride, and polyarylsulfone.

In a twenty-fifth aspect, the disclosure provides the membrane of any one of the twentieth through twenty-fourth aspects, wherein the hydrophobic polymeric filter media is chosen from ultra high molecular weight polyethylene and poly(tetrafluoro ethylene).

In an twenty-sixth aspect, the disclosure provides the membrane of any one of the twentieth through twenty-fifth aspects, wherein the crosslinker is chosen from methylene bis(acrylamide), tetraethylene glycol diacrylate, tetraethylene glycol diamethacrylate , divinyl sulfone, divinyl benzene, 1,3,5-triallyl-1,3,5-triazine-2,4,6(1H,3H,5H)-trione, and ethylene glycol divinyl ether.

In a twenty-seventh aspect, the disclosure provides the membrane of any one of the twentieth through the twenty-sixth aspects, wherein the monomer is chosen from 2-(dimethylamino)ethyl hydrochloride acrylate, [2-(acryloyloxy)ethyl]trimethylammonium chloride, 2-aminoethyl methacrylate hydrochloride, N-(3-aminopropyl) methacrylate hydrochloride, 2-(dimethylamino)ethyl methacrylate hydrochloride, [3-(methacryloylamino)propyl]trimethylammonium chloride solution, [2-(methacryloyloxy)ethyl]trimethylammonium chloride, acrylamidopropyl trimethylammonium chloride, 2-aminoethyl methacrylamide hydrochloride, N-(2-aminoethyl) methacrylamide hydrochloride, N-(3-aminopropyl)-methacrylamide hydrochloride, diallyldimethylammonium chloride, allylamine hydrochloride, vinyl imidazolium hydrochloride, vinyl pyridinium hydrochloride, vinyl benzyl dimethyl ammonium chloride, and acrylamido propyl trimethylammonium chloride, 2-ethylacrylic acid, acrylic acid, 2-carboxy ethyl acrylate, 3-sulfopropyl acrylate potassium salt, 2-propyl acrylic acid, 2-(trifluoromethyl)acrylic acid, methacrylic acid, 2-methyl-2-propene-1-sulfonic acid sodium salt, mono-2-(methacryloyloxy)ethyl maleate, 3-sulfopropyl methacrylate potassium salt, 2-acrylamido-2-methyl-1-propanesulfonic acid, 3-methacrylamido phenyl boronic acid, vinyl sulfonic acid, and vinyl phosphonic acid.

In a twenty-eighth aspect, the disclosure provides the membrane of any one of the twentieth through the twenty-sixth aspects, wherein the monomer is chosen from 2-ethylacrylic acid, acrylic acid, 2-carboxy ethyl acrylate, 3-sulfopropyl acrylate potassium salt, 2-propyl acrylic acid, 2-(trifluoromethyl)acrylic acid, methacrylic acid, 2-methyl-2-propene-1-sulfonic acid sodium salt, mono-2-(methacryloyloxy)ethyl maleate, 3-sulfopropyl methacrylate potassium salt, 2-acrylamido-2-methyl-1-propanesulfonic acid, 3-methacrylamido phenyl boronic acid, vinyl sulfonic acid, and vinyl phosphonic acid.

In a twenty-ninth aspect, the disclosure provides the membrane of any one of the twentieth through the twenty-sixth aspects, wherein the monomer is chosen from acryl amide, N,N dimethyl acrylamide, N-(hydroxyethyl)acrylamide, diacetone acrylamide, N-[tris(hydroxymethyl) methyl]acrylamide, N-(isobutoxymethyl)acrylamide, N-(3-methoxypropyl)acrylamide, 7-[4-(trifluoromethyl)coumarin]acrylamide, N-isopropyl acrylamide, 2-(dimethylamino)ethyl acrylate, 1,1,1,3,3,3-hexafluoroisopropyl acrylate, ethyl acrylate, 2-hydroxyethyl acrylate, butyl acrylate, ethylene glycol methyl ether acrylate, 4-hydroxybutyl acrylate, hydroxypropyl acrylate, 4-acetoxyphenethyl acrylate, benzyl acrylate, 1-vinyl-2-pyrrolidinone, vinyl acetate, ethyl vinyl ether, vinyl 4-tert-butylbenzoate, and phenyl vinyl sulfone.

In a thirtieth aspect, the disclosure provides a. porous filter membrane comprising a polyamide polymer which is soluble in a mixture of formic acid and dichloromethane, wherein said membrane is grafted with pendant hydrophilic groups chosen from hydroxyl groups, amine groups, carboxylic groups, or combinations thereof; and pendant ionic groups that are different from the pendant hydrophilic groups.

In a thirty-first aspect, the disclosure provides a porous composite filter membrane comprising a porous hydrophobic polymeric filter membrane having coated thereon a coating, wherein said coating is a polyamide polymer which is soluble in a blend of formic acid and dichloromethane, thereby providing a polyamide-coated membrane, which membrane is thereafter grafted with pendant hydrophilic groups chosen from hydroxyl groups, amine groups, carboxylic groups, or combinations thereof; and pendant ionic groups that are different from the pendant hydrophilic groups.

In a thirty-second aspect, the disclosure provides the membrane of the thirtieth or thirty-first aspects, wherein the polyamide polymer possesses a repeat unit structure of the formula —[(CH₂)ₓC(O)NH]ₙ—, wherein x is an integer of from about 8 to 12, and n represents the number of repeat units in the polyamide polymer.

In a thirty-third aspect, the disclosure provides the membrane of the thirtieth or thirty-first aspects, wherein the polyamide polymer is chosen from Nylon 11 and Nylon 12.

In a thirty-fourth aspect, the disclosure provides the membrane of the thirtieth or thirty-first aspects, which has the following characteristics:

a. a surface energy of about 30 to about 100 dynes/cm;

b. an isopropanol flowtime of about 150 to about 20,000 seconds/500 mL, measured at 14.2 psi;

c. a bubble point of about 20 to about 200 psi, when measured using ethoxy-nonafluorobutane HFE 7200 at a temperature of about 22° C.; and d. the capacity to bind Ponceau S dye of between about 1 and about 300 μg/cm² and the capacity to bind methylene blue dye (MB DBC) of between about 1 and about 300 μg/cm².

In a thirty-fifth aspect, the disclosure provides the membrane of the thirty-first aspect, wherein the hydrophobic polymeric filter media is chosen from polyethylene, polypropylene, polycarbonate, poly(tetrafluoro ethylene), polyvinylidene fluoride, and polyarylsulfone.

In a thirty-sixth aspect, the disclosure provides the membrane of the thirty-first aspect, wherein the hydrophobic polymeric filter media is chosen from ultra high molecular weight polyethylene and poly(tetrafluoro ethylene).

In a thirty-seventh aspect, the disclosure provides a method for preparing the composite porous filter membrane of any one of the first through sixth aspects which comprises:

a. dissolving a polyamide polymer in a mixture of formic acid and dichloromethane to form a polyamide solution, b. contacting a porous hydrophobic polymeric filter media with said polyamide solution to provide a polyamide-coated membrane, c. submerging said polyamide-coated membrane in an aqueous solution comprising water, d. rinsing said polyamide-coated membrane in $C_1$-$C_4$ alcohols and water, and e. drying said polyamide-coated membrane.

In a thirty-eighth aspect, the disclosure provides the method of the thirty-seventh aspect, wherein the polyamide is chosen from Nylon 11 and Nylon 12.

In a thirty-ninth aspect, the disclosure provides a method for preparing the composite porous filter membrane of any one of the twelfth through the twenty-first aspects, which comprises which comprises:

i. dissolving a hydrophilic polyamide polymer in a mixture of formic acid and dichloromethane to form a polyamide solution, ii. contacting a porous hydrophobic polymeric filter media with said polyamide solution to provide a polyamide-coated membrane, iii. submerging said polyamide-coated membrane in an aqueous bath solution comprising water, at least one crosslinker, at least one monomer, and at least one photo-initiator, iv. removing the resulting membrane from said bath, and applying ultraviolet radiation, followed by v. rinsing said polyamide-coated membrane in $C_1$-$C_4$ alcohols and water, and vi. drying said composite porous filter membrane.

In a fortieth aspect, the disclosure provides the method of the thirty-ninth aspect, wherein the polyamide is chosen from Nylon 11 and Nylon 12.

In a forty-first aspect, the disclosure provides a method for preparing the composite membrane of the thirty-first aspect, which comprises:

contacting the membrane of the first aspect with a photoinitiator solution comprising solvent and photoinitiator, to place the photoinitiator at surfaces of the polyamide polymer;

after contacting the surfaces with the photoinitiator solution to place the photoinitiator at the surfaces, contacting the surfaces with a monomer solution comprising charged monomer, wherein the charged monomer comprises ionic groups; and exposing the surfaces to electromagnetic radiation to cause the ionic groups to become grafted to the polyamide polymer.

In a forty-second aspect, the disclosure provides a method for preparing the composite porous filter membrane of the thirtieth aspect, comprising:

contacting the membrane of the seventh aspect with a photoinitiator solution comprising solvent and photoinitiator, to place the photoinitiator at surfaces of the polyamide polymer;

after contacting the surfaces with the photoinitiator solution to place the photoinitiator at the surfaces, contacting the surfaces with a monomer solution comprising charged monomer, wherein the charged monomer comprises ionic groups; and exposing the surfaces to electromagnetic radiation to cause the ionic groups to become grafted to the polyamide polymer.

In a forty-third aspect, the disclosure provides a method for preparing the membrane of the twelfth aspect, comprising:

i. submerging the membrane of the seventh aspect in an aqueous bath solution comprising water, at least one crosslinker, at least one monomer, and at least one photo-initiator, ii. removing the resulting membrane from said bath, and applying ultraviolet radiation, followed by iii. rinsing said membrane in $C_1$-$C_4$ alcohols and water, and drying said membrane.

In a forty-fourth aspect, the disclosure provides a method for removing an impurity from a liquid, which comprises contacting the liquid with the membrane of any one of the first through the thirty-sixth aspects.

In a forty-fifth aspect, the disclosure provides a filter comprising the membrane of any one of the first through the sixth aspects.

In a forty-sixth aspect, the disclosure provides a filter comprising the membrane of any one of the seventh through the eleventh aspects.

In a forty-seventh aspect, the disclosure provides a filter comprising the membrane of any one of the twelfth through the twenty-first aspects.

In a forty-eighth aspect, the disclosure provides a filter comprising the membrane of any one of the twenty-second through the twenty-ninth aspects.

In a forty-ninth aspect, the disclosure provides a filter comprising the membrane of the thirtieth aspect.

In a fiftieth aspect, the disclosure provides a filter comprising the membrane of the thirty-first aspect.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. Changes may be made in details, without exceeding the scope of the disclosure. The disclosure's scope is, of course, defined in the language in which the appended claims are expressed.

What is claimed is:

1. A composite porous filter membrane comprising:

a porous hydrophobic polymeric filter media having a coating thereon which at least partially coats surfaces throughout the porous hydrophobic polymeric filter media, wherein said coating is a polyamide polymer possessing a repeat unit structure of the formula —$[(CH_2)_xC(O)NH]_n$—, wherein x is an integer of from about 8 to 12, and n represents the number of repeat units in the polyamide polymer, and wherein the composite porous filter membrane has the following characteristics:

(i) a surface energy of from greater than 30 to 100 dynes/cm;

(ii) an isopropanol flowtime of about 150 to about 20,000 seconds/500 mL, measured at 14.2 psi;

(iii) a bubble point of about 20 to about 200 psi, when measured using ethoxy-nonafluorobutane HFE 7200 at a temperature of about 22° C.;

(iv) a capacity to bind Ponceau S dye of between about 1 and about 30 $\mu g/cm^2$ and the capacity to bind methylene blue dye (MB DBC) of between about 1 and about 30 $\mu g/cm^2$; and (v) after exposure of the composite porous filter membrane to a >96% formic acid solution for 24 hours and flushing of the composite porous filter membrane with de-ionized water until a stable pH is obtained, the composite porous filter membrane retaining the surface energy of from greater than 30 to 100 dynes/cm.

2. The composite porous filter membrane of claim 1, wherein the polyamide polymer is chosen from Nylon 11 and Nylon 12.

3. The composite porous filter membrane of claim 1, wherein the porous hydrophobic polymeric filter media is chosen from polyethylene, polypropylene, polycarbonate, poly (tetrafluoro ethylene), polyvinylidene fluoride, and polyarylsulfone.

4. The composite porous filter membrane of claim 3, wherein the porous hydrophobic polymeric filter media is chosen from ultrahigh molecular weight polyethylene and poly (tetrafluoro ethylene).

5. The composite porous filter membrane of claim 1, wherein the hydrophobic polymeric filter media having a coating thereon is coated with a free-radical reaction product of (i) at least one crosslinker and (ii) at least one monomer in the presence of a photo-initiator.

6. The composite porous filter membrane of claim 5, wherein each of the at least one crosslinker is chosen from methylene bis(acrylamide), tetraethylene glycol diacrylate, tetraethylene glycol dimethacrylate, divinyl sulfone, divinyl benzene, 1,3,5-triallyl-1,3,5-triazine-2,4,6(1H,3H,5H)-tri-one, and ethylene glycol divinyl ether.

7. The composite porous filter membrane of claim 5, wherein each of the at least one monomer is chosen from
2-(dimethylamino) ethyl hydrochloride acrylate, [2-(acryloyloxy)ethyl]trimethylammonium chloride, 2-aminoethyl methacrylate hydrochloride, N-(3-ami-nopropyl) methacrylate hydrochloride, 2-(dimethyl-amino)ethyl methacrylate hydrochloride, [3-(meth-acryloylamino)propyl]trimethylammonium chloride solution, [2-(methacryloyloxy)ethyl]trimethylammo-nium chloride, acrylamidopropyl trimethylammonium chloride, 2-aminoethyl methacrylamide hydrochloride, N-(2-aminoethyl) methacrylamide hydrochloride, N-(3-aminopropyl)-methacrylamide hydrochloride, diallyldimethylammonium chloride, allylamine hydro-chloride, vinyl imidazolium hydrochloride, vinyl pyri-dinium hydrochloride, vinyl benzyl trimethyl ammo-nium chloride, and acrylamido propyl trimethylammonium chloride, 2-ethylacrylic acid, acrylic acid, 2-carboxy ethyl acrylate, 3-sulfopropyl acrylate potassium salt, 2-propyl acrylic acid, 2-(trif-luoromethyl)acrylic acid, methacrylic acid, 2-methyl-2-propene-1-sulfonic acid sodium salt, mono-2-(meth-acryloyloxy)ethyl maleate, 3-sulfopropyl methacrylate potassium salt, 2-acrylamido-2-methyl-1-propane-sulfonic acid, 3-methacrylamido phenyl boronic acid, vinyl sulfonic acid, and vinyl phosphonic acid.

8. The composite porous filter membrane of claim 5, from 2-ethylacrylic acid, acrylic acid, 2-carboxy ethyl acrylate, 3-sulfopropyl acrylate potassium salt, 2-propyl acrylic acid, 2-(trifluoromethyl)acrylic acid, methacrylic acid, 2-methyl-2-propene-1-sulfonic acid sodium salt, mono-2-(methacry-loyloxy) ethyl maleate, 3-sulfopropyl methacrylate potas-sium salt, 2-acrylamido-2-methyl-1-propanesulfonic acid, 3-methacrylamido phenyl boronic acid, vinyl sulfonic acid, and vinyl phosphonic acid.

9. The composite porous filter membrane of claim 5, wherein each of the at least one monomer is chosen from acryl amide, N,N-dimethyl acrylamide, N-(hydroxyethyl) acrylamide, diacetone acrylamide, N-[tris(hydroxymethyl) methyl] acrylamide, N-(isobutoxymethyl)acrylamide, N-(3-methoxypropyl)acrylamide, 7-[4-(trifluoromethyl) coumarin] acrylamide, N-isopropyl acrylamide, 2-(dimethylamino)ethyl acrylate, 1,1,1,3,3,3-hexafluoroiso-propyl acrylate, ethyl acrylate, 2-hydroxyethyl acrylate, butyl acrylate, ethylene glycol methyl ether acrylate, 4-hy-droxybutyl acrylate, hydroxypropyl acrylate, 4-acetoxy-phenethyl acrylate, benzyl acrylate, 1-vinyl-2-pyrrolidinone, vinyl acetate, ethyl vinyl ether, vinyl 4-tert-butylbenzoate, and phenyl vinyl sulfone.

10. The composite porous filter membrane of claim 1, wherein the composite membrane is grafted with pendant hydrophilic groups chosen from hydroxyl groups, amine groups, carboxylic groups, or combinations thereof; and pendant ionic groups that are different from the pendant hydrophilic groups.

11. A method for removing an impurity from a liquid, which comprises contacting the liquid with the composite porous filter membrane of claim 1.

12. A filter comprising the composite porous filter mem-brane of claim 1.

* * * * *